(12) United States Patent
Suginohara et al.

(10) Patent No.: US 9,779,651 B2
(45) Date of Patent: Oct. 3, 2017

(54) IMAGE PROCESSING DEVICE, METHOD, AND PROGRAM, AND IMAGE DISPLAY DEVICE

(71) Applicant: MITSUBISHI ELECTRIC CORPORATION, Tokyo (JP)

(72) Inventors: Hidetsugu Suginohara, Tokyo (JP); Satoshi Yamanaka, Tokyo (JP); Kazuhiro Ishiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 217 days.

(21) Appl. No.: 14/778,194

(22) PCT Filed: Jun. 20, 2013

(86) PCT No.: PCT/JP2013/066923
§ 371 (c)(1),
(2) Date: Sep. 18, 2015

(87) PCT Pub. No.: WO2014/203366
PCT Pub. Date: Dec. 24, 2014

(65) Prior Publication Data
US 2016/0203751 A1  Jul. 14, 2016

(51) Int. Cl.
*G09G 3/20* (2006.01)
*G09G 3/36* (2006.01)
(Continued)

(52) U.S. Cl.
CPC ........... *G09G 3/2074* (2013.01); *G09G 3/003* (2013.01); *G09G 3/20* (2013.01); *G09G 3/2003* (2013.01);
(Continued)

(58) Field of Classification Search
CPC ......... H04N 13/0409; H04N 13/0445–13/045; H04N 2013/0463–2013/0465; G09G 2320/0209
See application file for complete search history.

(56) References Cited

U.S. PATENT DOCUMENTS 6,618,115 B1   9/2003  Hiroki
8,154,800 B2 *  4/2012  Kean ................. G02B 27/2214
                                                            353/7
(Continued)

FOREIGN PATENT DOCUMENTS

CN        1377021 A    10/2002
CN        1871630 A    11/2006
(Continued)

*Primary Examiner* — Patrick F Marinelli
(74) *Attorney, Agent, or Firm* — Birch, Stewart, Kolasch & Birch, LLP

(57) ABSTRACT

An image processing device includes: a terminal that receives an image signal for a display for displaying images in directions, the display including pixels having sub-pixels and a parallax optical element for directing light from each sub-pixel in a direction predetermined for each sub-pixel, the signal including a grayscale value of each sub-pixel; a memory that stores information indicating a defective sub-pixel displayed in a direction due to a defect of the parallax optical element; and a corrector that determines, using the grayscale value of a sub-pixel whose predetermined direction is another direction different from the predetermined direction of the defective sub-pixel, a grayscale value of the defective sub-pixel for the image displayed in the other direction, and outputs a corrected image signal including, as a grayscale value of the defective sub-pixel, the smaller of the grayscale value of the defective sub-pixel in the image signal and the determined value.

11 Claims, 11 Drawing Sheets

(51) Int. Cl.
*H04N 13/04* (2006.01)
*G09G 3/00* (2006.01)

(52) U.S. Cl.
CPC ........... *G09G 3/36* (2013.01); *H04N 13/0422* (2013.01); *G09G 2320/0242* (2013.01); *G09G 2330/10* (2013.01); *H04N 13/0409* (2013.01)

(56) References Cited

U.S. PATENT DOCUMENTS

| | | | | |
|---|---|---|---|---|
| 8,547,311 | B2* | 10/2013 | Chen | G09G 3/3611 345/87 |
| 9,165,495 | B2* | 10/2015 | Tsuei | G09G 3/2003 |
| 9,491,446 | B2* | 11/2016 | Inoue | G09G 3/20 |
| 2002/0135598 | A1 | 9/2002 | Tezuka et al. | |
| 2005/0111100 | A1 | 5/2005 | Mather et al. | |
| 2006/0244476 | A1 | 11/2006 | Zhang et al. | |
| 2007/0210987 | A1 | 9/2007 | Hashimoto et al. | |
| 2007/0222724 | A1* | 9/2007 | Ueno | G09G 3/3648 345/87 |
| 2009/0002268 | A1* | 1/2009 | Ueta | B60K 35/00 345/7 |
| 2009/0079680 | A1* | 3/2009 | Yagiura | G09G 3/003 345/87 |
| 2009/0102767 | A1* | 4/2009 | Shiomi | G09G 3/003 345/88 |
| 2009/0168164 | A1* | 7/2009 | Kean | G02B 27/2214 359/463 |
| 2010/0039418 | A1* | 2/2010 | Chen | G09G 3/3611 345/208 |
| 2013/0321598 | A1* | 12/2013 | Inoue | G09G 3/20 348/54 |
| 2014/0160174 | A1* | 6/2014 | Tsuei | G09G 3/2003 345/690 |
| 2015/0092026 | A1* | 4/2015 | Baik | H04N 13/0018 348/54 |
| 2015/0356908 | A1* | 12/2015 | Yagiura | G09G 3/003 345/695 |
| 2016/0044305 | A1* | 2/2016 | Kim | H04N 13/0018 348/54 |
| 2016/0203751 | A1* | 7/2016 | Suginohara | G09G 3/20 345/694 |

FOREIGN PATENT DOCUMENTS

| | | |
|---|---|---|
| GB | 2405516 A | 3/2005 |
| JP | 1-154196 A | 6/1989 |
| JP | 2001-222265 A | 8/2001 |
| JP | 2003-222837 A | 8/2003 |
| JP | 2003-262890 A | 9/2003 |
| JP | 2006-309244 A | 11/2006 |
| JP | 2007-49598 A | 2/2007 |
| JP | 2009-47965 A | 3/2009 |
| JP | 2009-80237 A | 4/2009 |
| JP | 2009-145640 A | 7/2009 |
| JP | 4367775 B2 | 11/2009 |
| JP | 4530267 B2 | 8/2010 |
| JP | 4754682 B2 | 8/2011 |
| WO | WO 2012/070444 A1 | 5/2012 |

* cited by examiner

IMAGE PROCESSING DEVICE, METHOD, AND PROGRAM, AND IMAGE DISPLAY DEVICE

TECHNICAL FIELD

The present invention relates to an image processing device, method, and program, and an image display device.

BACKGROUND ART

In flat panel displays such as liquid crystal display devices, the display resolution or pixel density has been improved. Problems of display panels for such flat panel displays include improvement of yields. It is extremely difficult to manufacture a display panel having no pixel defect. "Pixel defect" refers to constantly causing a bright spot of red, green, blue, or white, or a dark spot (black spot) of black regardless of a displayed image. A display panel typically has pixel defects. If the number of pixel defects is small, consumers accept the display panel. However, consumers tend to demand a display panel having no pixel defect.

Techniques for making such pixel defects less visible have been developed. Patent Reference 1 discloses a technique for preventing a white spot defect due to a defect of a color filter in a color liquid crystal panel by correcting an electrical signal input to a drive element for driving a picture element having the defect in the color filter. Further, Patent Reference 2 discloses a technique for making a pixel defect less conspicuous by changing an image to be displayed on pixels peripheral to a pixel having the pixel defect. "Picture element" refers to a pixel.

Meanwhile, technology has been developed that enables different images to be perceived on the same display screen depending on the viewing direction by use of a liquid crystal display device and a parallax optical element (see Patent References 3 and 4). Using this technology, dual-view displays have been put to practical use that simultaneously display a navigation image to a driver's seat side and a television image or the like to a passenger's seat side. Also, using this technology, multi-view displays have been put to practical use that can simultaneously display different images in three or more directions such as the front, left, and right directions. Further, using this technology, naked eye 3D displays have been put to practical use that present the left eye and right eye with respective images having parallax without the use of special glasses.

PRIOR ART REFERENCES

Patent References

Patent Reference 1: Japanese Patent Application Publication No. Hei 1-154196
Patent Reference 2: Japanese Patent Application Publication No. 2006-309244
Patent Reference 3: Japanese Patent No. 4530267
Patent Reference 4: Japanese Patent No. 4367775

SUMMARY OF THE INVENTION

Problems to be Solved by the Invention

In a display device, such as those described above, that displays multiple images in different display directions, a defect of a parallax optical element such as a parallax barrier may allow a sub-pixel to be displayed in a display direction other than the original display direction, thereby causing a bright spot and deteriorating the visibility or display quality.

An object of the present invention is therefore to provide an image processing device, an image processing method, an image processing program, and an image display device capable of reducing the occurrence of a bright spot due to a defect of a parallax optical element in a display unit that displays multiple images in different display directions.

Means for Solving the Problems

An image processing device of the present invention includes: an image input unit that receives an image signal including a grayscale value corresponding to each sub-pixel of a display unit for displaying a plurality of different images in a plurality of different respective display directions, the display unit including a plurality of pixels and a parallax optical element, the plurality of pixels including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display unit; a defect information storage unit that stores defect information indicating a defective sub-pixel, the defective sub-pixel being one of the sub-pixels that is also displayed in one or more display directions other than an original display direction due to a defect of the parallax optical element; and a correction unit that determines, as a correction value, on a basis of the grayscale values of a plurality of sub-pixels whose original display direction is another display direction different from the original display direction of the defective sub-pixel indicated by the defect information in the image signal, a grayscale value corresponding to the defective sub-pixel for the image displayed in the other display direction, and outputs a corrected image signal including, as a grayscale value of the defective sub-pixel, the smaller of the grayscale value of the defective sub-pixel included in the image signal and the correction value.

An image display device of the present invention includes: the above image processing device; and the display unit that displays the plurality of different images in the plurality of different respective display directions on a basis of the corrected image signal output by the correction unit.

An image processing method of the present invention includes: an image input step for receiving an image signal including a grayscale value corresponding to each sub-pixel of a display unit for displaying a plurality of different images in a plurality of different respective display directions, the display unit including a plurality of pixels and a parallax optical element, the plurality of pixels including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display unit; a defect information storing step for storing defect information indicating a defective sub-pixel, the defective sub-pixel being one of the sub-pixels that is also displayed in one or more display directions other than an original display direction due to a defect of the parallax optical element; and a correction step for determining, as a correction value, on a basis of the grayscale values of a plurality of sub-pixels whose original display direction is another display direction different from the original display direction of the defective sub-pixel indicated by the defect information in the image signal, a grayscale value corresponding to the defective sub-pixel for the image displayed in said another display direction, and outputting a corrected image signal including, as a grayscale value of the defective sub-pixel, the smaller of the grayscale value of the defective sub-pixel included in the image signal and the correction value.

An image processing program of the present invention causes a computer to execute: an image input step for receiving an image signal including a grayscale value corresponding to each sub-pixel of a display unit for displaying a plurality of different images in a plurality of different respective display directions, the display unit including a plurality of pixels and a parallax optical element, the plurality of pixels including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display unit; a defect information storing step for storing defect information indicating a defective sub-pixel, the defective sub-pixel being one of the sub-pixels that is also displayed in one or more display directions other than an original display direction due to a defect of the parallax optical element; and a correction step for determining, as a correction value, on a basis of the grayscale values of a plurality of sub-pixels whose original display direction is another display direction different from the original display direction of the defective sub-pixel indicated by the defect information in the image signal, a grayscale value corresponding to the defective sub-pixel for the image displayed in said another display direction, and outputting a corrected image signal including, as a grayscale value of the defective sub-pixel, the smaller of the grayscale value of the defective sub-pixel included in the image signal and the correction value.

Effect of the Invention

According to the present invention, it is possible to reduce the occurrence of a bright spot due to a defect of a parallax optical element in a display unit that displays multiple images in different display directions.

MODES FOR CARRYING OUT THE INVENTION

Embodiments of the present invention will now be described with reference to the drawings.

First Embodiment

Figure 1:
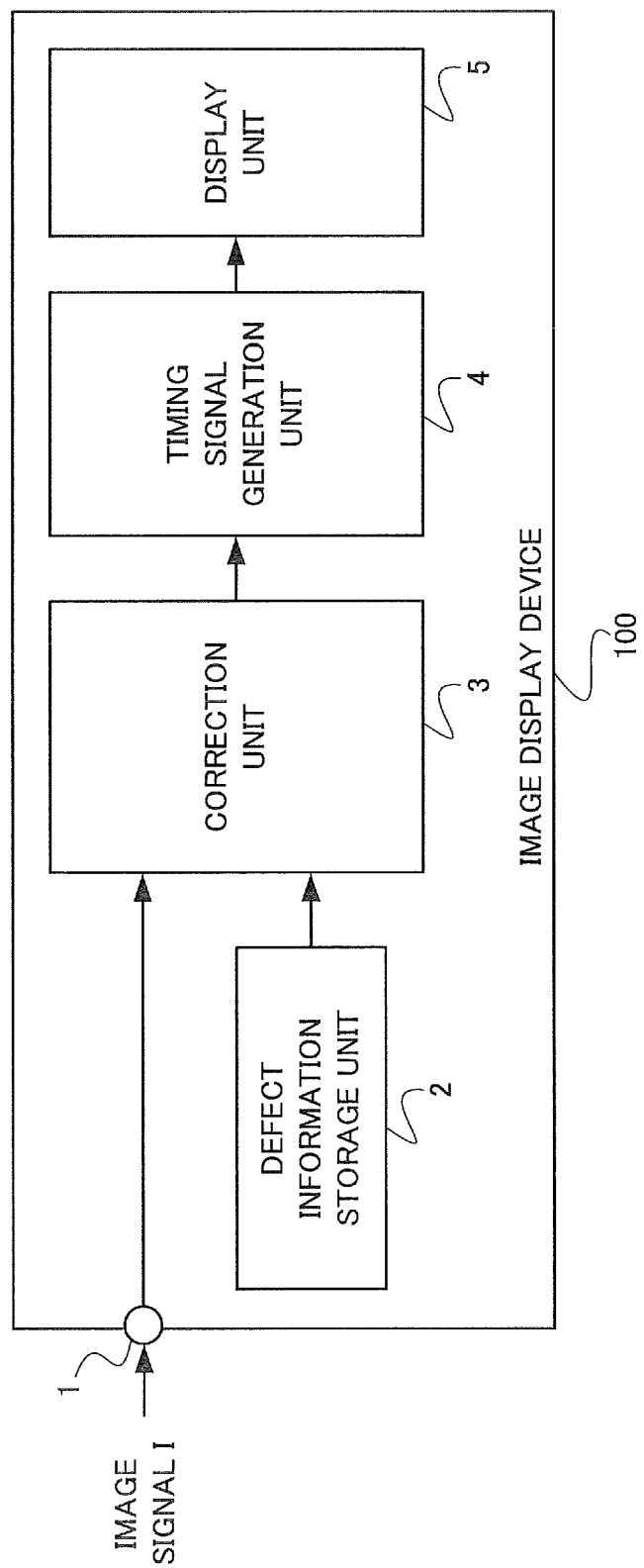
FIG. 1 is a block diagram schematically illustrating a configuration of an image display device in a first embodiment.

FIG. 1 is a block diagram schematically illustrating a configuration of an image display device 100 in the first embodiment of the present invention. The image display device 100 is a device for displaying two images (or pictures) in different respective directions from the same display screen. For example, the image display device 100 is a directional image display device that presents viewers in multiple directions with different respective images, or a 3D image display device that presents the left eye and right eye with respective images with parallax.

In FIG. 1, the image display device 100 includes an image input unit 1, a defect information storage unit (or defect information memory) 2, a correction unit (or corrector) 3, a timing signal generation unit 4, and a display unit (or display) 5.

The image input unit 1 receives an image signal (or image data) I. The image input unit 1 is, for example, an input terminal. The image signal I is a signal representing a grayscale value of each sub-pixel of an image obtained by combining a first image and a second image that are different from each other. "Combining" here refers to mixing and arranging, on a single image, respective sub-pixels of pixels of multiple images (in this example, the first image and second image). "Mixing and arranging" refers to, for example, arranging alternately. Here, the image signal I is a digital signal consisting of the grayscale value of each sub-pixel and a synchronizing signal. The image signal I is a signal output from a head unit device, which obtains the signal by combining a car navigation image and a DVD-reproduced image. The image signal I input into the image input unit 1 is sent to the correction unit 3. "Head unit device" refers to, for example, an audio device having a car navigation function, a DVD reproducing function, an amplifying function, or the like.

The defect information storage unit 2 stores defect information that is information regarding a defect of an optical system of the display unit 5. The defect information storage unit 2 is, for example, a nonvolatile memory. The defect information storage unit 2 sends the defect information to the correction unit 3. The defect information will be detailed later.

The correction unit 3 receives the image signal I and defect information. The correction unit 3 performs correction on the image signal I on the basis of the defect information stored in the defect information storage unit 2. The correction unit 3 performs correction on the image signal I to reduce deterioration of the visibility or display quality due to a defect of a parallax optical element of the display unit 5. The correction in the correction unit 3 will be detailed later. The correction unit 3 outputs the corrected image signal.

The timing signal generation unit 4 generates, for the display unit 5, a timing signal for displaying the corrected image signal, on the basis of the corrected image signal output by the correction unit 3. The timing signal includes a start pulse, effective period information, polarity information, and the like. The timing signal generation unit 4 outputs the generated timing signal together with the corrected image signal to the display unit 5.

The display unit 5 displays an image on the basis of the timing signal and corrected image signal. Specifically, the display unit 5 displays, on the basis of the corrected image signal, the multiple images (in this example, the first image and second image) in different respective display directions (in this example, a first display direction and a second display direction).

The display unit 5 and image signal I will now be described in detail.

The display unit 5 displays the multiple different images (in this example, the first image and second image) in the multiple different respective display directions (in this example, the first display direction and second display direction). Also, the display unit 5 has a structure in which multiple pixels each including one or more sub-pixels are arranged. The display unit 5 includes multiple pixels including two or more sub-pixels corresponding to two or more respective colors. The display unit 5 also includes the parallax optical element. The parallax optical element directs light from each sub-pixel of the display unit 5 in a display direction predetermined for each sub-pixel among the multiple display directions (in this example, the first and second display directions). The parallax optical element includes a parallax barrier, a lenticular lens, or the like. The parallax barrier includes a parallax barrier and an active parallax barrier. The parallax barrier is one in which transmission portions and non-transmission portions are arranged periodically. The active parallax barrier is one having transmission portions capable of being changed to non-transmission portions and non-transmission portions capable of being changed to transmission portions. The active parallax barrier is implemented by using, for example, a liquid crystal device with a simple structure that is not a matrix driving type. Further, the display unit 5 is configured so that the sub-pixels displayed in the respective display directions are mixed together. In this example, the display unit 5 is configured so that the sub-pixels displayed in the first display direction and the sub-pixels displayed in the second display direction are mixed together, for example, arranged alternately.

The image signal I is a signal representing an image in which the first image and second image, which are displayed in the different display directions from the display unit 5, are combined. Also, the image signal I has a structure in which multiple pixels each including one or more sub-pixels are arranged. The image signal I has a structure in which multiple pixels including two or more sub-pixels corresponding to two or more respective colors are arranged. Further, the image signal I is a signal representing a grayscale value of each sub-pixel of an image in which sub-pixels constituting the first image and sub-pixels constituting the second image are arranged alternately. Specifically, the image signal I is a signal representing a grayscale value of each sub-pixel of an image in which the multiple images displayed in the multiple different display directions are arranged alternately on a sub-pixel by sub-pixel basis. The image signal I is also a signal including a grayscale value corresponding to each sub-pixel of the display unit 5.

The display unit 5 is composed of the sub-pixels arranged corresponding to the respective sub-pixels of the image signal I. Each of the sub-pixels of the display unit 5 displays light at a grayscale level according to the grayscale value of the sub-pixel of the image signal I corresponding to the sub-pixel of the display unit 5. That is, each of the sub-pixels of the display unit 5 displays light at a grayscale level corresponding to the grayscale value of the sub-pixel of the image signal I corresponding to the sub-pixel of the display unit 5. More specifically, each of the sub-pixels of the display unit 5 that are displayed in the first display direction displays, in the first display direction, light at a grayscale level according to the grayscale value of the sub-pixel of the image signal I constituting the first image and corresponding to the sub-pixel of the display unit 5. That is, each of the sub-pixels of the display unit 5 that are displayed in the first display direction displays, in the first display direction, light at a grayscale level corresponding to the grayscale value of the sub-pixel of the image signal I constituting the first image and corresponding to the sub-pixel of the display unit 5. Each of the sub-pixels of the display unit 5 that are displayed in the second display direction displays, in the second display direction, light at a grayscale level according to the grayscale value of the sub-pixel of the image signal I constituting the second image and corresponding to the sub-pixel of the display unit 5. That is, each of the sub-pixels of the display unit 5 that are displayed in the second display direction displays, in the second display direction, light at a grayscale level corresponding to the grayscale value of the sub-pixel of the image signal I constituting the second image and corresponding to the sub-pixel of the display unit 5. Thereby, the first image is displayed in the first display direction and the second image is displayed in the second display direction.

In one aspect, in the display unit 5 and image signal I, one pixel is composed of three sub-pixels of red (R), green (G), and blue (B). Further, the multiple pixels are arranged two-dimensionally in two different directions (e.g., a width direction and a height direction). The sub-pixels constituting the first image and the sub-pixels constituting the second image are arranged alternately at intervals of one sub-pixel in the two different directions.

Specifically, the display unit 5 includes a display panel for displaying a combined image that is an image in which multiple images are combined, and a parallax optical element serving as an optical system for separating the combined image displayed on the display panel into the multiple images. The display panel has a structure in which the multiple sub-pixels are arranged. The parallax optical element has a structure that directs light from each of the sub-pixels of the display panel to its display direction.

Figure 2:
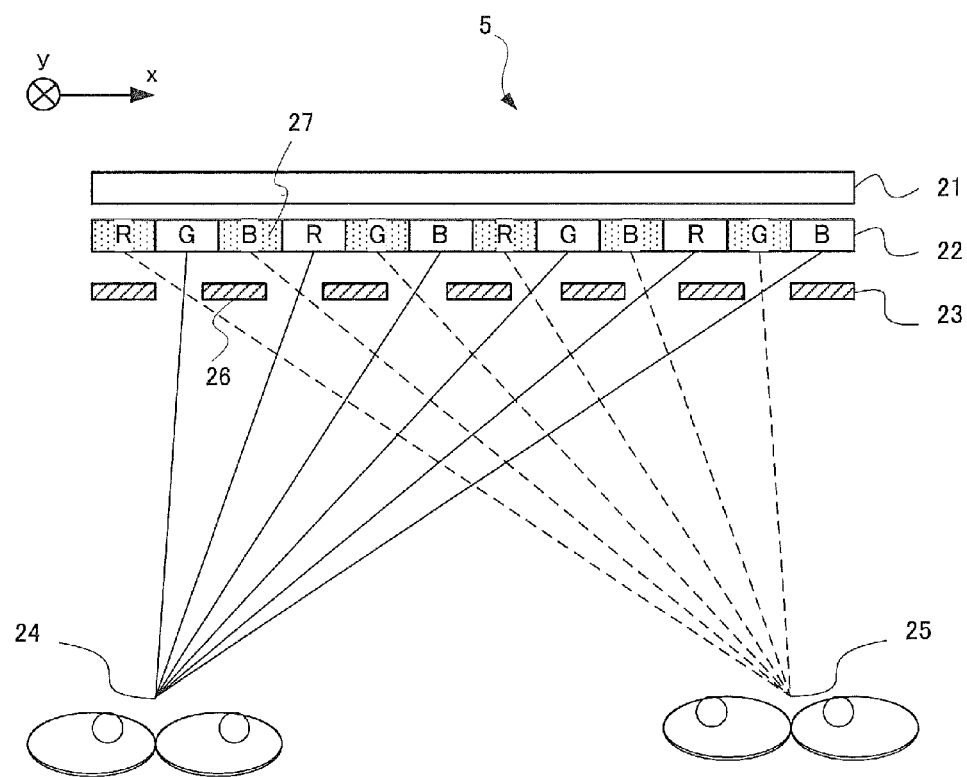
FIG. 2 is a schematic plan view illustrating an example of a configuration of a display unit.

FIG. 2 is a schematic plan view illustrating an example of the configuration of the display unit 5. The display unit 5 includes a liquid crystal display device and a parallax barrier 23 in a checkered fashion (also referred to as a checkerboard fashion) as the parallax optical element. "Checkered fashion" refers to a checkered pattern. "Checkered pattern" refers to a checked pattern in which two-colored squares or rectangles are arranged alternately. The display unit 5 is capable of simultaneously displaying different images in the two directions. Specifically, the display unit 5 includes a backlight 21, a liquid crystal panel 22 as the display panel, and the parallax barrier 23 as the parallax optical element. These are arranged in the order of the parallax barrier 23, liquid crystal panel 22, and backlight 21 as viewed from a viewer's side. In the liquid crystal panel 22, a group of sub-pixels of three colors of red (R), green (G), and blue (B)

constitutes one pixel. Further, in the liquid crystal panel 22, multiple pixels are arranged in order. The parallax barrier 23 blocks light from each sub-pixel in such a manner that sub-pixels displayed to a viewer 24 on the left as viewed toward the liquid crystal panel 22 and sub-pixels displayed to a viewer 25 on the right as viewed toward the liquid crystal panel 22 are arranged alternately at intervals of one sub-pixel. "Block light" refers to intercepting light, or interrupting light. For example, a sub-pixel 27 of blue (B) is visible from the viewer 25 on the right, but is shielded in a direction of the viewer 24 on the left by a light blocking portion 26 included in the parallax barrier 23. Thus, when the display unit 5 is viewed by the viewer 24 on the left, the liquid crystal panel 22 is shielded by the parallax barrier 23 at intervals of one sub-pixel, and half of the area of the liquid crystal panel 22 is visible. On the other hand, when the display unit 5 is viewed by the viewer 25 on the right, the sub-pixels shielded with respect to the viewer 24 are visible. Also, when the display unit 5 is viewed by the viewer 25 on the right, the sub-pixels visible by the viewer 24 are shielded, and half of the area of the liquid crystal panel 22 is visible.

FIG. 2 shows an aspect in which multiple sub-pixels are arranged in an x-direction that is the width direction, but the multiple sub-pixels in the liquid crystal panel 22 are arranged two-dimensionally in the x-direction that is the width direction and a y-direction that is the height direction. Further, the parallax barrier 23 has a checkered structure in such a manner that the sub-pixels displayed to the viewer 24 on the left and the sub-pixels displayed to the viewer 25 on the right are arranged alternately at intervals of one sub-pixel in the width direction and height direction. The width direction and height direction are also referred to as the horizontal direction and vertical direction, respectively.

Figure 3:
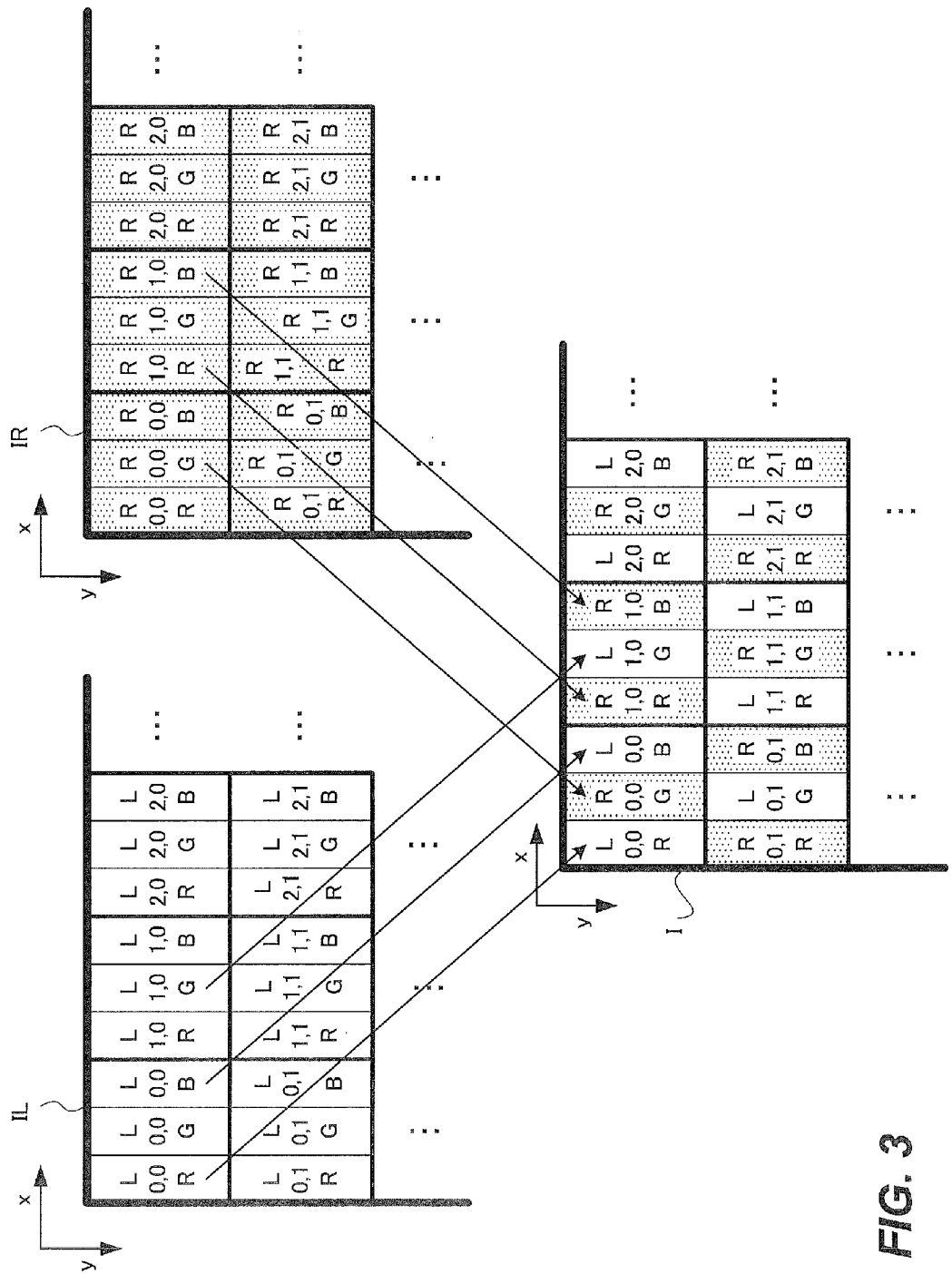
FIG. 3 is a diagram illustrating an example of a sub-pixel arrangement of an image signal in a dual-view display device.

FIG. 3 is a diagram illustrating an example of a sub-pixel arrangement of the image signal I. FIG. 3 illustrates a pixel arrangement of the image signal I on a sub-pixel by sub-pixel basis. This sub-pixel arrangement of the image signal I corresponds to the liquid crystal panel 22 of the display unit 5 in FIG. 2. In the sub-pixel arrangement of the image signal I, two images are arranged in a checkered fashion on a sub-pixel by sub-pixel basis. Each cell in FIG. 3 represents a sub-pixel. "Cell" refers to a quadrangular section. In the description in the cell of each sub-pixel, the first row indicates the image constituted by the sub-pixel (or the display direction in which the sub-pixel is displayed, or a viewing direction). "Viewing direction" refers to a direction in which the display surface is viewed. "Viewing direction" coincides with or corresponds to the display direction. In the description in the first row, "L" denotes a "left image" that is displayed to the viewer on the left, or a "left direction" that is a direction in which it is displayed; "R" denotes a "right image" that is displayed to the viewer on the right, or a "right direction" that is a direction in which it is displayed. Further, in FIG. 3, the second row in the cell of each sub-pixel indicates coordinates of the pixel in which the sub-pixel is included. A coordinate value in the x-direction, which is the width direction, and a coordinate value in the y-direction, which is the height direction, are represented in the form of "x, y." Further, in FIG. 3, the third row in the cell of each sub-pixel indicates the color (red (R), green (G), or blue (B)) of the sub-pixel.

In FIG. 3, a group of three-color sub-pixels of red (R), green (G), and blue (B) constitutes one pixel. The multiple sub-pixels are arranged two-dimensionally in the width and height directions. Further, the sub-pixels constituting the left image and the sub-pixels constituting the right image are arranged alternately at intervals of one sub-pixel in the width and height directions. "Arranged" refers to being put in order.

Such an image signal I is obtained, for example, as illustrated in FIG. 3, by selecting and combining, in a checkered fashion, grayscale values of sub-pixels of an original image signal IL for the left image and grayscale values of sub-pixels of an original image signal IR for the right image. Specifically, regarding even numbered lines (lines with even coordinate values y), the image signal I is obtained by combining the grayscale values of sub-pixels of the two image signals IL and IR in the order of red (R) of the left image, green (G) of the right image, blue (B) of the left image, red (R) of the right image, . . . . The even numbered line in the image signal I illustrated in FIG. 3 is, for example, the line at the coordinate value y="0." Regarding odd numbered lines (lines with odd coordinate values y), the image signal I is obtained by combining the grayscale values of sub-pixels of the two image signals IL and IR in the order of red (R) of the right image, green (G) of the left image, blue (B) of the right image, red (R) of the left image, . . . . The odd numbered line in the image signal I illustrated in FIG. 3 is, for example, the line at the coordinate value y="1."

Figure 4:
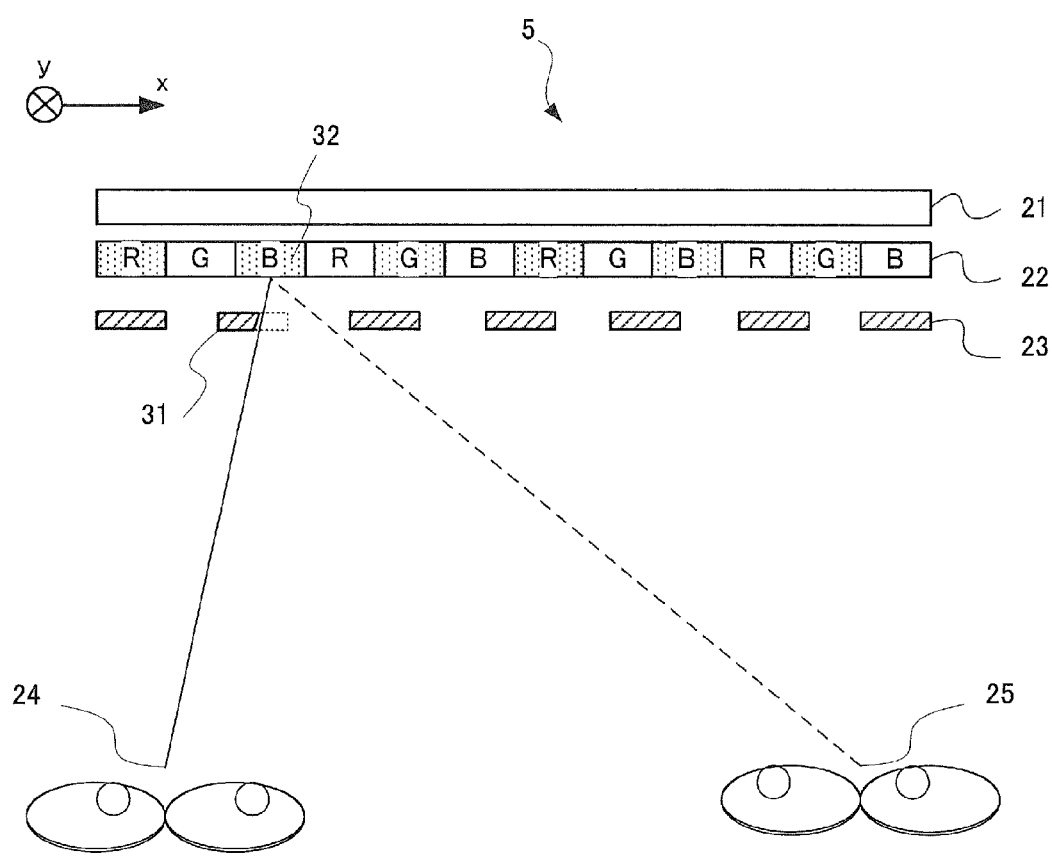
FIG. 4 is a diagram illustrating an example of a case where a parallax barrier in the display unit in FIG. 2 has a defect.

FIG. 4 is a diagram illustrating an exemplary case where the parallax barrier 23 in the display unit 5 in FIG. 2 has a defect. In FIG. 4, a light blocking portion 31 that is second from the left lacks its right side. The missing part of the light blocking portion 31 is indicated by the dashed line. An example of how a sub-pixel at a defect position of the parallax barrier 23 is viewed when the image signal I is displayed by the display unit 5 will be described below with reference to FIG. 4. Hereinafter, a defect of the parallax barrier 23 will be referred to as a "barrier defect." In FIG. 4, the light blocking portion 31, which corresponds to a blue sub-pixel 32, of the parallax barrier 23 has a defect of lacking the right side. Due to this barrier defect, the blue sub-pixel 32 is visible from not only the viewer 25 on the right, which is an original direction, but also the viewer 24 on the left, which is a direction in which it should originally be shielded. In the image signal I, the blue sub-pixel 32 is a sub-pixel of the right image. Thus, the viewer 24 on the left sees the blue sub-pixel 32 with the barrier defect in the left image viewed by the viewer 24. That is, the viewer 24 sees the blue sub-pixel 32 of the right image. On the other hand, no problems occur in the image visible by the viewer 25 on the right.

As such, if a barrier defect occurs, a sub-pixel corresponding to the barrier defect is also displayed in the other display direction other than the original display direction. This causes a problem that when an original image is viewed from the display direction other than the original display direction of the sub-pixel corresponding to the barrier defect, the sub-pixel, which fails to be shielded due to the barrier defect, is visible in the original image.

For example, in the example of FIG. 4, if the left image is dark grey and the right image is bright blue around the barrier defect, the viewer 24 on the left sees a blue bright spot in the grey image. In this manner, a barrier defect may cause deterioration of the visibility or display quality.

Such a problem also occurs due to a defect of a parallax optical element other than the barrier defect. Specifically, even if a parallax optical element other than the parallax barrier is used, a defect of the parallax optical element causes a problem that a sub-pixel corresponding to the defect of the parallax optical element is displayed in the display direction other than the original display direction, deteriorating the visibility or display quality.

On the other hand, if the right image is black, the viewer 24 on the left does not perceive the barrier defect. This is because the blue sub-pixel 32 is shielded with respect to the viewer 24 on the left if the light blocking portion 31 of the parallax barrier 23 has no defect, and it is normal that the part at the sub-pixel 32 looks black. Also, if the left image and right image are similar to each other on the periphery of the barrier defect, the sub-pixel 32 of the right image, which is not shielded, blends in with the original left image without discomfort, the viewer 24 on the left can scarcely perceive the barrier defect.

From this, even if there is a sub-pixel that is displayed in the display direction other than the original display direction due to a defect of the parallax optical element, the occurrence of a bright spot in the display direction other than the original display direction can be reduced by controlling the grayscale value of the sub-pixel.

The defect information storage unit 2 and correction unit 3 will be detailed below.

The defect information storage unit 2 stores defect information. The defect information is information indicating a defective sub-pixel. The defective sub-pixel is a sub-pixel that is also displayed in the display direction other than the original display direction due to a defect of the parallax optical element, of the sub-pixels in the display unit 5. That is, the defect information is information indicating a sub-pixel with a defect, of the sub-pixels in the display unit 5.

The defect information is, for example, information obtained by previously examining defects of the optical system of the display unit 5. For example, the display unit 5 is caused to display a black image as the left image and a white image as the right image. Then, whether a bright spot occurs is determined by viewing the display unit 5 from the left. Similarly, the display unit 5 is caused to display a white image as the left image and a black image as the right image. Then, whether a bright spot occurs is determined by viewing the display unit 5 from the right. This method shows whether the parallax optical element has a defect. Further, if a bright spot occurs, information indicating a defective sub-pixel can be obtained from the position of the bright spot. In determining the occurrence of a bright spot, if a single color (red, green, or blue) that each sub-pixel has is displayed as the left image and right image instead of the white image, the position of a defective sub-pixel can be determined more finely on a sub-pixel basis.

The defect information in the first embodiment will be specifically described. The defect information is information indicating the position of a defective sub-pixel. For example, the defect information is information indicating the coordinates of the pixel including a defective sub-pixel in the display unit 5 and the color of the defective sub-pixel. The coordinates of the pixel can be indicated by, for example, how many pixels there are from an origin to the pixel in each of the horizontal and vertical directions, the origin being the upper left pixel as viewed toward the display surface. "Origin" here refers to the origin of coordinates. The first embodiment assumes that the number of defects of the parallax optical element in the display unit 5 is one, and the defect information is information indicating the position of one defective sub-pixel. However, the number of defects is not limited to one. Depending on the number of defects of the parallax optical element in the display unit 5, the defect information storage unit 2 may store the positions of multiple defective sub-pixels.

The correction unit 3 receives the image signal I and the defect information stored in the defect information storage unit 2. The correction unit 3 corrects the grayscale value of the sub-pixel of the image signal I displayed at the position indicated by the defect information, i.e., the grayscale value corresponding to the defective sub-pixel indicated by the defect information. In the first embodiment, the correction unit 3 corrects the grayscale value of the defective sub-pixel by using the grayscale value of at least one sub-pixel that is included in at least one pixel located on the periphery of the pixel including the defective sub-pixel and has the same color as the defective sub-pixel. That is, when the pixel including the defective sub-pixel is referred to as the defective pixel, the correction unit 3 corrects the grayscale value of the defective sub-pixel by using the grayscale value of at least one sub-pixel that is in at least one pixel located on the periphery of the defective pixel and has the same color as the defective sub-pixel. The correction unit 3 corrects the grayscale value of the defective sub-pixel included in the image signal I by using the grayscale value of at least one sub-pixel that is displayed in the display direction different from the original display direction of the defective sub-pixel and is located on the periphery of the defective sub-pixel.

Specifically, the correction unit 3 determines, with respect to the defective sub-pixel indicated by the defect information, as a correction value, on the basis of the grayscale values of multiple sub-pixels whose original display direction is the other display direction different from the original display direction of the defective sub-pixel in the image signal I, a grayscale value corresponding to the defective sub-pixel for the image displayed in the other display direction. Here, the grayscale value corresponding to the defective sub-pixel for the image displayed in the other display direction is, for example, a grayscale value that should be displayed at the position of the defective sub-pixel in the image displayed in the other display direction. For example, the correction unit 3 determines the grayscale value corresponding to the defective sub-pixel for the image displayed in the other display direction, by interpolating it from the grayscale values of multiple sub-pixels that are originally displayed in the other display direction, are located on the periphery of the defective sub-pixel, and have the same color as the defective sub-pixel. Then, the correction unit 3 outputs a corrected image signal including, as a grayscale value of the defective sub-pixel, the smaller of the grayscale value of the defective sub-pixel included in the image signal I and the determined correction value. Here, the smaller refers to the smaller in brightness, i.e., the darker of the grayscale value and correction value.

Figure 5:
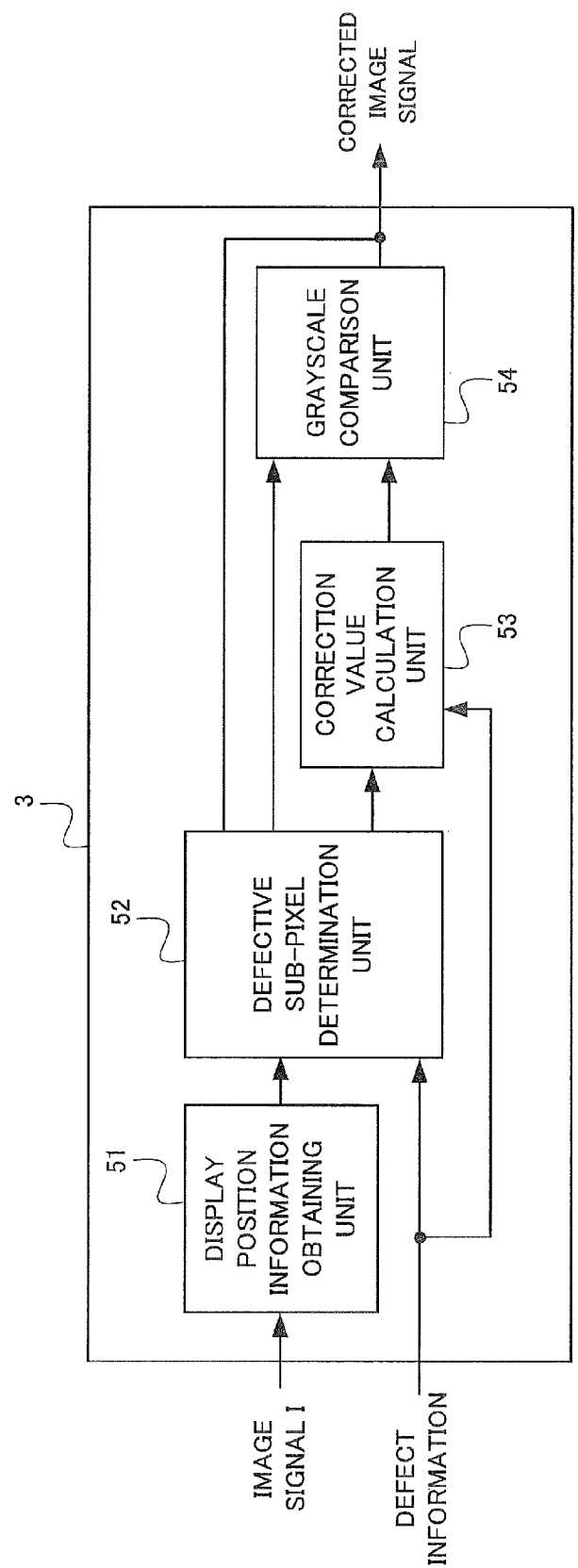
FIG. 5 is a block diagram illustrating a configuration of a correction unit in the first embodiment.

FIG. 5 is a block diagram illustrating a configuration of the correction unit 3. The configuration of the correction unit 3 will be described below with reference to FIG. 5.

As illustrated in FIG. 5, the correction unit 3 receives the image signal I and also receives the defect information from the defect information storage unit 2. The correction unit 3 includes a display position information obtaining unit (or display position information determiner) 51, a defective sub-pixel determination unit (or defective sub-pixel determiner) 52, a correction value calculation unit (or correction value calculator) 53, and a grayscale comparison unit (or grayscale comparator) 54.

The display position information obtaining unit 51 obtains the grayscale value of each sub-pixel of the image signal I and display position information of each sub-pixel. The display position information indicates the position in the display unit 5 at which the grayscale value of the sub-pixel of the image signal I is displayed. The display position information includes, for example, information indicating how many pixels there are from an origin to the pixel at which an input grayscale value of a sub-pixel of the image signal I is displayed in each of the horizontal and vertical directions, the origin being the upper left pixel of the display unit 5. The display position information also includes information indicating the color of the sub-pixel of the display unit 5 at which the input grayscale value of the sub-pixel of the image signal I is displayed. The display position information may be generated by, each time the grayscale value of a sub-pixel is input, counting it by a counter for each of the horizontal direction and vertical direction. The display position information may also be generated by a coordinate position counter on the basis of synchronizing enable signals input together with the grayscale values of the sub-pixels. The display position information obtaining unit 51 sequentially outputs the grayscale value of each sub-pixel of the image signal I and its display position information.

The defective sub-pixel determination unit 52 receives the grayscale value of a sub-pixel and its display position information output by the display position information obtaining unit 51. The defective sub-pixel determination unit 52 also receives the defect information from the defect information storage unit 2. Further, the defective sub-pixel determination unit 52 determines, on the basis of the display position information received from the display position information obtaining unit 51, whether the grayscale value of the sub-pixel received from the display position information obtaining unit 51 is to be displayed at the position indicated by the defect information. That is, the defective sub-pixel determination unit 52 determines whether the received grayscale value of the sub-pixel is the grayscale value corresponding to the defective sub-pixel. If the received grayscale value of the sub-pixel does not correspond to the defective sub-pixel, the defective sub-pixel determination unit 52 outputs the grayscale value of the sub-pixel without correcting it. That is, the defective sub-pixel determination unit 52 outputs the received grayscale value of the sub-pixel as a grayscale value of the sub-pixel in the corrected image signal. If the received grayscale value of the sub-pixel corresponds to the defective sub-pixel, the defective sub-pixel determination unit 52 determines the sub-pixel as a sub-pixel to be corrected. Then, the defective sub-pixel determination unit 52 outputs the grayscale value of the sub-pixel to be corrected to the grayscale comparison unit 54. Also, the defective sub-pixel determination unit 52 outputs, to the correction value calculation unit 53, the grayscale value of at least one sub-pixel displayed on the periphery of the sub-pixel to be corrected. The defective sub-pixel determination unit 52 may have a memory to output the grayscale value of the sub-pixel to be corrected and the grayscale value of the at least one sub-pixel peripheral thereto.

The correction value calculation unit 53 receives, from the defective sub-pixel determination unit 52, the grayscale value of the at least one sub-pixel displayed on the periphery of the sub-pixel to be corrected. The correction value calculation unit 53 calculates, on the basis of the grayscale value of the at least one sub-pixel displayed on the periphery of the sub-pixel to be corrected, a correction value for the sub-pixel to be corrected, and outputs it to the grayscale comparison unit 54. The calculation of the correction value in the correction value calculation unit 53 is based on the grayscale values of one or more sub-pixels that are displayed in the display direction different from the original display direction of the sub-pixel to be corrected and have the same color as the sub-pixel to be corrected, of the at least one sub-pixel displayed on the periphery of the sub-pixel to be corrected.

When the display unit 5 is viewed from the other display direction other than the original display direction of the sub-pixel to be corrected, the sub-pixel to be corrected, which should originally be shielded, is visible due to the defect of the parallax optical element. In the above situation, if it is possible to mix light from the sub-pixel to be corrected with the image of the other display direction without discomfort, it is possible to prevent lowering of the visibility and prevent degradation of the display quality. The correction value calculation unit 53 calculates the correction value so that light from the sub-pixel to be corrected is mixed with the image of the other display direction without discomfort. "Mixed without discomfort" indicates that when the display unit 5 is viewed from the other display direction, the sub-pixel to be corrected looks as if it is continuously connected with an image displayed on the periphery thereof.

The above correction value can be obtained by interpolating the grayscale value of the sub-pixel to be corrected in the image displayed in the other display direction. Thus, the calculation process of the correction value can be replaced with an interpolation process of an image. The image signal I is a signal in which the left image and right image are arranged alternately on a sub-pixel by sub-pixel basis, as illustrated in FIG. 3. The image signal I has sub-pixel signals for the left image and sub-pixel signals for the right image. For example, it will be assumed that a sub-pixel originally displayed in the left direction is also displayed in the right direction due to a defect of the parallax optical element. The grayscale value corresponding to this sub-pixel is for the image on the left, which is the original display direction, and the image signal I includes no grayscale value corresponding to the sub-pixel for the right image. The correction value determined by the correction value calculation unit 53 is a grayscale value corresponding to the sub-pixel to be corrected for the right image. This grayscale value can be interpolated and determined on the basis of information that is included in the image signal I and is on a part of the right image displayed on the periphery of the sub-pixel to be corrected. The color displayed by each sub-pixel is predetermined, and thus the interpolation process is performed by using the grayscale values of sub-pixels having the same color as the sub-pixel to be corrected.

The correction value can be calculated in various ways. As one of the methods, there is a method of determining, as the correction value, an average value of the grayscale values of a group of sub-pixels having the same color as the sub-pixel to be corrected. "Group of sub-pixels having the same color as the sub-pixel to be corrected" here refers to a group of sub-pixels that are displayed in the display direction different from that of the sub-pixel to be corrected and have the same color as the sub-pixel to be corrected, out of the sub-pixels included in the pixels adjacent, in the up, down, left, and right directions, to the pixel including the sub-pixel to be corrected. Also, the correction value calculation unit 53 may perform an edge direction detection process on a group of sub-pixels that are displayed in the display direction different from that of the sub-pixel to be corrected and have the same color as the sub-pixel to be corrected, out of sub-pixels displayed on the periphery of the sub-pixel to be corrected, and determine the correction value by using the results.

The grayscale comparison unit 54 receives the grayscale value of the sub-pixel to be corrected output by the defective sub-pixel determination unit 52 and the correction value determined by the correction value calculation unit 53, and compares these two values. Then, it outputs the smaller of the two values as a corrected grayscale value of the sub-pixel to be corrected (i.e., a grayscale value of the sub-pixel to be corrected in the corrected image signal).

A case where the grayscale value of the sub-pixel to be corrected is larger than the correction value will be described.

If the grayscale value of the sub-pixel to be corrected, which is larger than the correction value, is simply displayed by the display unit 5, there is no particular problem when the display unit 5 is viewed from the original display direction of the sub-pixel to be corrected. However, when the display unit 5 is viewed from the display direction other than the original display direction of the sub-pixel to be corrected, the sub-pixel to be corrected is perceived as a bright spot brighter than an image peripheral thereto. To prevent the occurrence of the bright spot, the grayscale comparison unit 54 compares the grayscale value of the sub-pixel to be corrected and the correction value, and outputs the smaller value, i.e., the correction value as the corrected grayscale value. If the correction value is displayed by the display unit 5, when the display unit 5 is viewed from the display direction other than the original display direction of the sub-pixel to be corrected, the sub-pixel to be corrected looks blending in with an image peripheral thereto without discomfort, and there is no particular problem. On the other hand, when the display unit 5 is viewed from the original display direction of the sub-pixel to be corrected, the sub-pixel to be corrected looks dark as compared to an image peripheral thereto.

Next, a case where the grayscale value of the sub-pixel to be corrected is smaller than the correction value will be described. If the correction value, which is larger than the grayscale value of the sub-pixel to be corrected, is displayed by the display unit 5, there is no particular problem when the display unit 5 is viewed from the display direction other than the original display direction of the sub-pixel to be corrected. However, when the display unit 5 is viewed from the original display direction of the sub-pixel to be corrected, the sub-pixel to be corrected is perceived as a bright spot brighter than an image peripheral thereto. To prevent the occurrence of the bright spot, the grayscale comparison unit 54 compares the grayscale value of the sub-pixel to be corrected and the correction value, and outputs the smaller value, i.e., the grayscale value of the sub-pixel to be corrected as the corrected grayscale value. If the grayscale value of the sub-pixel to be corrected is displayed by the display unit 5, there is no particular problem when the display unit 5 is viewed from the original display direction of the sub-pixel to be corrected. On the other hand, if the display unit 5 is viewed from the direction other than the original display direction of the sub-pixel to be corrected, the sub-pixel to be corrected looks dark as compared to an image peripheral thereto.

In this manner, the grayscale comparison unit 54 compares the grayscale value of the sub-pixel to be corrected and the correction value, and outputs the smaller value as the corrected grayscale value of the sub-pixel to be corrected (i.e., the grayscale value of the sub-pixel to be corrected in the corrected image signal). This makes it possible to prevent the occurrence of a bright spot in both the original display direction of the sub-pixel to be corrected and the other display direction.

As described before, consumers demand display panels having no pixel defects. However, it is extremely difficult to manufacture a display panel having no pixel defects. Currently, even when a display panel has pixel defects, if the number of pixel defects is not more than a reference number, the display panel is shipped as a normal product. Typically, the reference number of pixel defects is set for each of bright spots and dark spots, and the reference number for bright spots is smaller than the reference number for dark spots. This is because bright spots are likely to be conspicuous to the viewer and cause the viewer to feel the product to be defective, as compared to dark spots. "Consumer" here refers to a person who intends to purchase the display panel. "Viewer" refers to a person who uses the display panel and views an image output from the display panel. "Consumer" and "viewer" are separately used depending on the position relative to the display panel, but they are the same person in many cases.

In a display device that displays multiple images in different display directions, defects of the parallax optical element occur in addition to conventional pixel defects. The parallax optical element needs to be manufactured as finely as the display panel, and therefore it is extremely difficult to manufacture the parallax optical element having no defects. A defect of the parallax optical element is perceived as a bright spot or dark spot by a viewer. Whether it becomes a bright spot or a dark spot depends on a displayed image, and in particular if a moving image is displayed, it is perceived as flickering. In this manner, a defect of the parallax optical element causes deterioration of the visibility or display quality of an image to be originally displayed.

The process of the correction unit 3 makes it possible, when the parallax optical element has a defect, to prevent the occurrence of a bright spot, which particularly tends to be perceived as a manufacturing defect by the viewer. The process of the correction unit 3 can prevent the occurrence of a bright spot in both the original display direction of the sub-pixel to be corrected and the other display direction.

On the other hand, the process of the correction unit 3 may make the sub-pixel to be corrected a dark spot. However, the reference number for dark spots can be set to be larger than that for bright spots. Thus, the process of the correction unit 3 increases the number of parallax optical elements that have defects at multiple positions but can be shipped as normal products, and makes it possible to improve the manufacturing yield.

Figure 6:
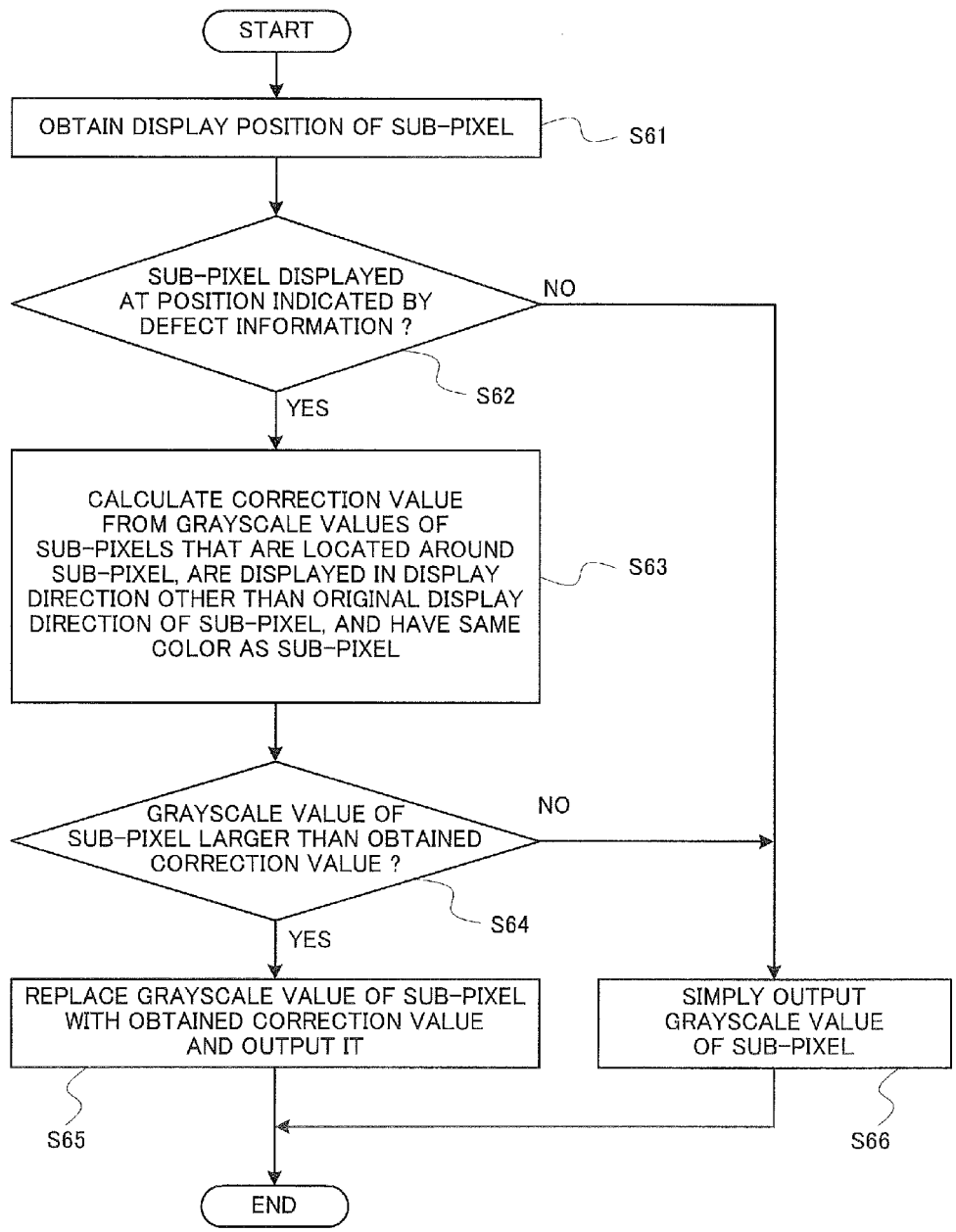
FIG. 6 is a flowchart illustrating the operation of the correction unit in the first embodiment.

FIG. 6 is a flowchart illustrating the process of the correction unit 3. The operation of the correction unit 3 will be described below with reference to FIG. 6. The process of FIG. 6 is performed on the grayscale value of each sub-pixel of the image signal I.

When the correction unit 3 obtains the grayscale value of a sub-pixel to be processed, it obtains display position information indicating at which position on the display unit 5 the sub-pixel is displayed (S61).

Next, the correction unit 3 determines, on the basis of the display position information obtained in step S61 and the position information of the barrier defect included in the defect information, whether the sub-pixel to be processed is a sub-pixel displayed at the position of the barrier defect (S62).

If it is determined that the sub-pixel is not the sub-pixel displayed at the position indicated by the defect information (NO in S62), the correction unit 3 simply outputs the grayscale value of the sub-pixel without correcting it (S66), and ends the process.

On the other hand, if it is determined that the sub-pixel is the sub-pixel displayed at the position indicated by the defect information (YES in S62), the correction unit 3 calculates a correction value from the grayscale values of a group of sub-pixels that are located on the periphery of the sub-pixel, are displayed in the display direction other than the original display direction of the sub-pixel, and have the same color as the sub-pixel (S63), and proceeds to step S64.

In step S64, the correction unit 3 determines whether the grayscale value of the sub-pixel to be processed is larger than the correction value calculated in step S63.

If it is determined that the grayscale value of the sub-pixel is not larger than the correction value (NO in S64), the correction unit 3 simply outputs the grayscale value of the sub-pixel to be processed without correcting it (S66), and ends the process.

On the other hand, if it is determined that the grayscale value of the sub-pixel is larger than the correction value (YES in S64), the correction unit 3 replaces the grayscale value of the sub-pixel to be processed with the correction value and outputs it (S65).

Figure 7:
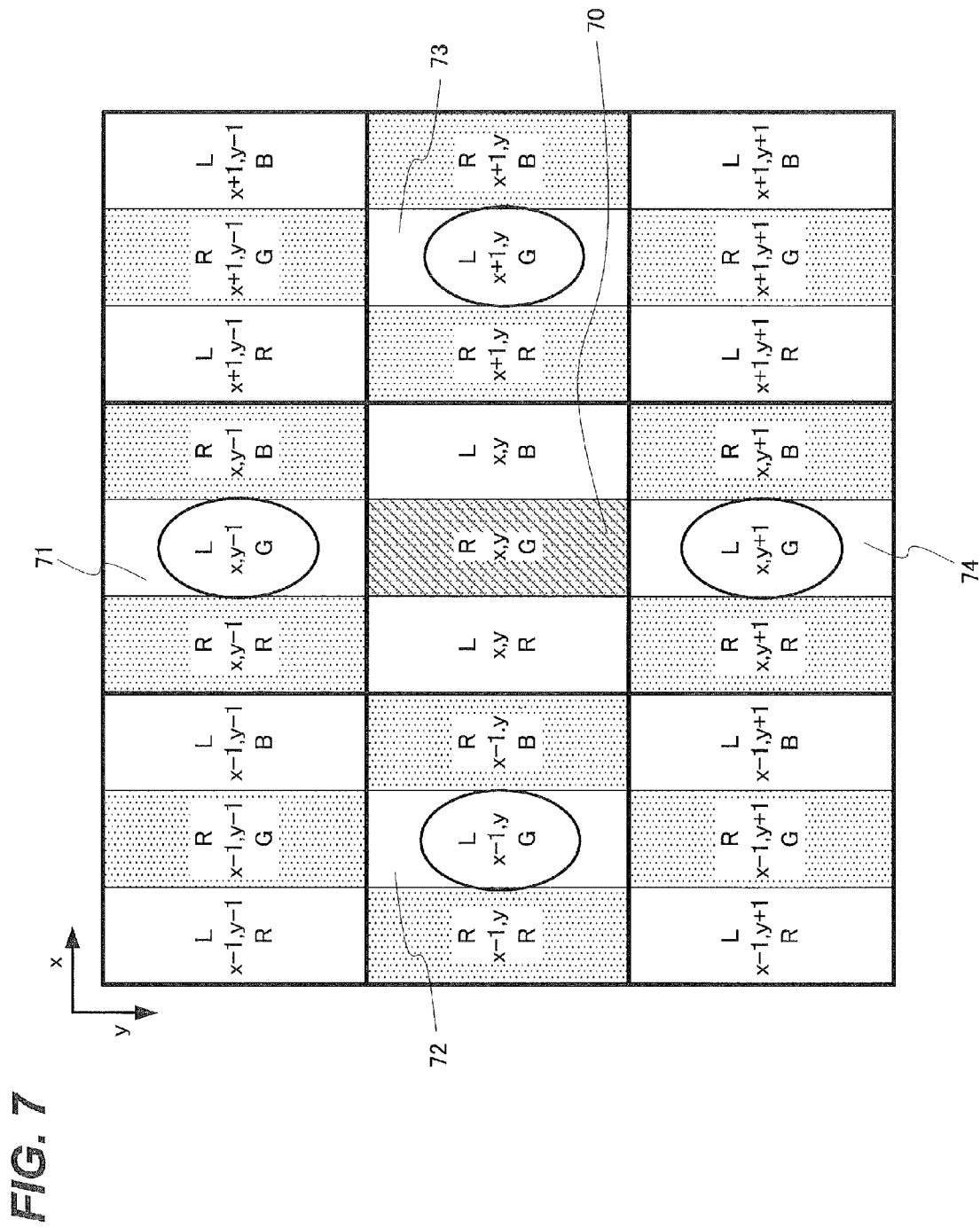
FIG. 7 is a diagram for explaining a specific example of the process of the correction unit.

FIG. 7 is a diagram for explaining a specific example of the process of the correction unit 3. The specific example of the process of the correction unit 3 will be described below with reference to FIG. 7. Here, it will be assumed that a barrier defect occurs with respect to a green sub-pixel 70 of the right image included in the pixel at coordinates (x, y), and the green sub-pixel 70 is also visible in the left direction. It will be assumed that the defect information storage unit 2 stores defect information indicating the green sub-pixel 70. FIG. 7 illustrates the pixel at coordinates (x, y) including the sub-pixel 70 located at the barrier defect position and eight pixels peripheral thereto, in the display unit 5 or image signal I. The notation in FIG. 7 is the same as in FIG. 3, so description thereof will be omitted.

The defective sub-pixel determination unit 52 sends the correction value calculation unit 53 the grayscale values of the multiple sub-pixels included in the pixel to which the sub-pixel 70 belongs and its peripheral pixels (specifically, the grayscale values of the 27 sub-pixels in the 9 pixels illustrated in FIG. 7). The defective sub-pixel determination unit 52 sends the grayscale values to the correction value calculation unit 53 when an input grayscale value of a sub-pixel of the image signal I is one to be displayed at the green sub-pixel 70 at coordinates (x, y). The above operation of the defective sub-pixel determination unit 52 is based on the defect information in the defect information storage unit 2.

The green sub-pixel 70 at coordinates (x, y) is visible not only in the right direction, which is the original display direction, but also in the left direction due to the barrier defect. However, the image signal I includes no grayscale value that should be displayed as the left image at the position of the sub-pixel 70. Thus, the correction value calculation unit 53 determines a grayscale value that should be displayed as the left image at the sub-pixel 70, as a correction value, from the grayscale values of sub-pixels that are located on the periphery of the sub-pixel 70, are displayed in the left direction, and have the same color as the sub-pixel 70. The left direction is a display direction affected by the barrier defect. In FIG. 7, as the sub-pixels that display the left image on the periphery of the sub-pixel 70 and have the same color (i.e., green) as the sub-pixel 70, there are a sub-pixel 71 in the pixel at coordinates (x, y−1) on the upper side, a sub-pixel 72 in the pixel at coordinates (x−1, y) on the left side, a sub-pixel 73 in the pixel at coordinates (x+1, y) on the right side, and a sub-pixel 74 in the pixel at coordinates (x, y+1) on the lower side. For example, the correction value calculation unit 53 determines, as the correction value, an average value of the grayscale values of these four sub-pixels 71 to 74. However, the range for determining the average value is not limited to the above range, and the sub-pixels used for calculating the average value are not limited to the above four sub-pixels. For example, the correction value calculation unit 53 may use only two sub-pixels on a single line out of the above four sub-pixels, or may use further peripheral sub-pixels.

The grayscale comparison unit 54 compares the grayscale value of the sub-pixel 70 and the above calculated correction value. Then, if the grayscale value is not larger than the correction value, the grayscale comparison unit 54 simply determines the grayscale value as the corrected grayscale value of the sub-pixel 70 to output the corrected image signal. If the grayscale value is larger than the correction value, the grayscale comparison unit 54 determines the correction value as the corrected grayscale value to output the corrected image signal.

If the process of the grayscale comparison unit 54 is not performed and the grayscale value of the sub-pixel to be corrected is always replaced with the correction value determined by the correction value calculation unit 53, a problem may occur in the original display direction of the sub-pixel to be corrected. Specifically, when the grayscale value of the sub-pixel to be corrected is smaller than the correction value, if the grayscale value of the sub-pixel to be corrected is replaced with the correction value, a bright spot occurs in the original display direction of the sub-pixel to be corrected. For example, assuming that both the grayscale value and correction value are represented by 8 bits and take a value from 0 to 255, when the grayscale value of the sub-pixel 70 in FIG. 7 is 0 (black) and the determined correction value is 250, if the grayscale value of the sub-pixel 70 is replaced with the correction value 250, a green bright spot occurs in the right direction, which is the original display direction of the sub-pixel 70. This bright spot may be perceived by the viewer on the right. In this case, for both the right and left directions, it is desirable that the original grayscale value 0 be displayed. Thus, the correction unit 3 compares the original grayscale value and the correction value to select the smaller (darker) value as the corrected grayscale value. This makes it possible to prevent the occurrence of a bright spot in both the original display direction of the sub-pixel with the barrier defect and the display direction other than the original display direction of the sub-pixel with the barrier defect.

The above description describes, as an example, a configuration that displays two images in two different respective display directions, but the image display device 100 may display three or more images in three or more different respective display directions. In this case, a defect of the parallax optical element may affect multiple display directions. For example, in a configuration that displays first to third images in first to third display directions respectively, when the parallax optical element has a defect with respect to a sub-pixel of the first image to be displayed in the first display direction, the defect of the parallax optical element may make the sub-pixel visible from the second and third display directions in addition to the first display direction. The defect of the parallax optical element may also make the sub-pixel visible from one of the second and third display directions in addition to the first display direction.

Thus, in one aspect, the defect information storage unit 2 stores, as defect information, in addition to information indicating a defective sub-pixel, information indicating one or more defect display directions that are display directions in which the defective sub-pixel is displayed due to the defect of the parallax optical element (i.e., display directions affected by the defect of the parallax optical element). The one or more defect display directions are one or more display directions in which the defective sub-pixel is displayed, other than the original display direction of the defective sub-pixel. The defect information storage unit 2 stores information indicating one or more defect display directions as described above, for each sub-pixel corresponding to a defect of the parallax optical element, i.e., for each defective sub-pixel. In determining a correction value for a sub-pixel to be corrected, the correction value calculation unit 53 determines, on the basis of the defect information in the defect information storage unit 2, a correction value for each defect display direction of the sub-pixel to be corrected. Specifically, the correction value calculation unit 53 determines, with respect to a defective sub-pixel indicated by the defect information, for each of the one or more defect display directions indicated by the defect information, on the basis of the grayscale values of multiple sub-pixels whose original display directions are the defect display direction, as a correction value, a grayscale value corresponding to the defective sub-pixel for the image displayed in the defect display direction. Then, the grayscale comparison unit 54 compares the grayscale value of the sub-pixel to be corrected and the one or more correction values determined for each defect display direction to select the smallest of these values, and determines the selected value as a corrected grayscale value of the sub-pixel to be corrected to output a corrected image signal. This makes it possible to prevent the occurrence of a bright spot in all the display directions. If the correction value calculation unit 53 can determine the defect display directions in another way, the defect information storage unit 2 need not store the information indicating the defect display directions.

In another aspect, in determining a correction value for a sub-pixel to be corrected, the correction value calculation unit 53 determines a correction value for each of the two or more other display directions of the multiple different display directions differing from the original display direction of the sub-pixel to be corrected. Specifically, the correction value calculation unit 53 determines, with respect to a defective sub-pixel indicated by the defect information, for each of the other display directions different from the original display direction of the defective sub-pixel, on the basis of the grayscale values of multiple sub-pixels whose original display directions are the other display direction, as a correction value, a grayscale value corresponding to the defective sub-pixel for the image displayed in the other display direction. Then, the grayscale comparison unit 54 compares the grayscale value of the sub-pixel to be corrected and the two or more correction values determined for each of the other display directions to select the smallest of these values, and outputs the selected value as a corrected grayscale value of the sub-pixel to be corrected. This makes it possible to prevent the occurrence of a bright spot in all the display directions. In this aspect, the correction value calculation unit 53 need not determine the defect display directions, and the defect information storage unit 2 need not store the information indicating the defect display directions.

Further, the degree of effect of a defect of the parallax optical element in a display direction affected by the defect of the parallax optical element may vary depending on the degree of the defect of the parallax optical element. For example, the visibility of the sub-pixel in a display direction affected by the defect of the parallax optical element may vary depending on the size of the defect of the parallax optical element. Thus, the correction value may be adjusted by, for example, being multiplied by a factor corresponding to the degree of the defect of the parallax optical element. In one aspect, the defect information storage unit 2 stores, as defect information, information indicating the degree of effect of the defect of the parallax optical element, for each of the one or more display directions (i.e., defect display directions) affected by the defect of the parallax optical element. The degree of effect of the defect of the parallax optical element refers to, for example, the visibility of the sub-pixel displayed at the barrier defect position. The correction value calculation unit 53 calculates or adjusts a correction value on the basis of the above information indicating the degree included in the defect information. For example, the correction value calculation unit 53 calculates a correction value by using the grayscale values of one or more sub-pixels peripheral to the sub-pixel to be corrected, and calculates a final correction value by multiplying the correction value by a factor corresponding to the degree of the barrier defect. The correction value is, for example, an average value of the grayscale values of multiple sub-pixels. The above factor includes, for example, an inverse of a ratio of an area visible due to the barrier defect to the whole of the sub-pixel (i.e., defective sub-pixel) displayed at the defect position of the parallax optical element.

Further, when the difference between the grayscale value of the sub-pixel to be corrected and the correction value is sufficiently small, even if the correction is not performed, the effect of the defect of the parallax optical element is less likely to be perceived. Thus, if the difference between the grayscale value of the sub-pixel to be corrected and the correction value is sufficiently small, the correction may not be performed. Thus, a margin may be provided in the comparison process in the grayscale comparison unit 54. For example, if the difference between the grayscale value of the sub-pixel to be corrected and the correction value is smaller than a predetermined threshold value, the grayscale comparison unit 54 may simply determine the grayscale value of the sub-pixel to be corrected as a corrected grayscale value to output a corrected image signal, regardless of the magnitude relationship between the grayscale value of the sub-pixel and the correction value. The above predetermined threshold value is, for example, set so that it becomes larger as the grayscale value of the sub-pixel to be corrected becomes larger. This is because human visual characteristics include a characteristic of perceiving a slight change in brightness more easily in a darker image.

Further, the above description describes, as an example, a pattern in which the sub-pixels constituting the first image and the sub-pixels constituting the second image are arranged alternately at intervals of one sub-pixel in the width and height directions, but the sub-pixels constituting the first image and the sub-pixels constituting the second image may be arranged alternately in other patterns. For example, the sub-pixels constituting the first image and the sub-pixels constituting the second image may be arranged alternately at intervals of one sub-pixel in one of the width and height directions, and only sub-pixels constituting the same image may be arranged in the other direction. That is, the pattern of the sub-pixel arrangement of the image signal I or the parallax barrier structure of the display unit 5 is not limited to a checkered pattern, and may be other patterns such as a striped pattern. Further, it is not limited to a pattern in which the sub-pixels constituting the first image and the sub-pixels constituting the second image are arranged alternately at intervals of one sub-pixel; for example, they may be arranged in such a manner that two sub-pixels constituting the first image alternate with two sub-pixels constituting the second image, or three sub-pixels constituting the first image alternate with one sub-pixel constituting the second image.

Further, the above description describes, as an example, a case where one pixel consists of sub-pixels of three colors of red, green, and blue, but one pixel may consist of one or more sub-pixels of one, two, four, or more colors. For example, one pixel may consist of sub-pixels of four colors of red, green, blue, and yellow (Y). In this case, RGBY sub-pixels constituting the first and second images are arranged as in, for example, the following pattern 1 or 2.
(Pattern 1)
Color of sub-pixels: RGBYGRYBRGBYGRYB
Image formed by sub-pixels: 1212121212121212
(Pattern 2)
Color of sub-pixels: RGBYRGBYRGBYRGBY
Image formed by sub-pixels: 1212212112122121

Further, the above description describes, as an example, a display unit having a liquid crystal panel as a display panel, but the correction process in this embodiment is also applicable to display units having other types of display panels, such as organic electroluminescence (EL) panels or plasma display panels.

Further, the above description describes, as an example, a display unit having a parallax barrier as a parallax optical element, but the correction process in this embodiment is also applicable to display units having other types of parallax optical elements for separating a combined image into multiple images.

The following advantages (1) to (3) can be obtained from this first embodiment described above.

(1) The image display device in this first embodiment calculates, on the basis of the defect information, on the basis of grayscale values of one or more sub-pixels whose original display direction is another display direction different from the original display direction of the defective sub-pixel in the image signal I, as a correction value, a grayscale value corresponding to the defective sub-pixel for the image of the other display direction, and outputs the smaller of the grayscale value of the defective sub-pixel included in the image signal I and the correction value, as a corrected grayscale value of the defective sub-pixel. This makes it possible to prevent the occurrence of a bright spot in both the original display direction of the defective sub-pixel and the other display direction different from the original display direction of the defective sub-pixel.

The occurrence of a defect of the parallax optical element such as a parallax barrier causes, for example, a problem that a sub-pixel to be displayed to a driver's seat side is visible in an image to be displayed to a passenger's seat side and deteriorates the visibility, or a problem that a sub-pixel to be displayed to the left eye is visible in an image to be displayed to the right eye and may interfere with 3D viewing. This embodiment can prevent the occurrence of a bright spot due to a defect of the parallax optical element such as a parallax barrier. This can reduce the above deterioration of the visibility or display quality.

(2) The image display device in this first embodiment can prevent the occurrence of a bright spot due to a defect of the parallax optical element. This can improve the yield of display units or image display devices having parallax optical elements.

(3) The image display device in this first embodiment calculates a correction value for the defective sub-pixel indicated by the defect information, on the basis of the grayscale values of one or more sub-pixels that are located on the periphery of the defective sub-pixel, are displayed in a display direction different from the original display direction of the defective sub-pixel, and have the same color as the defective sub-pixel. This makes it possible to perform display without discomfort in the display direction different from the original display direction of the defective sub-pixel.

Second Embodiment

Figure 8:
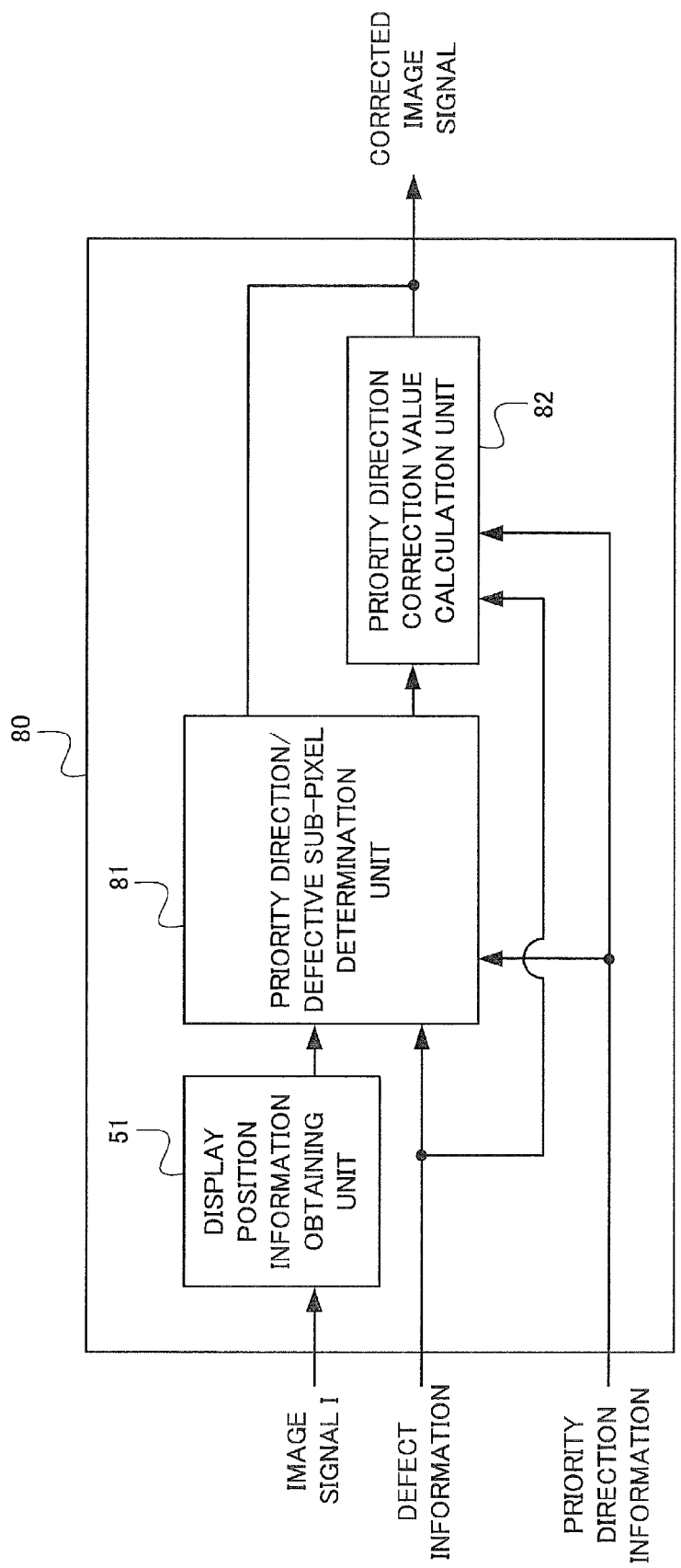
FIG. 8 is a block diagram illustrating a configuration of a correction unit in a second embodiment.

FIG. 8 is a block diagram illustrating a configuration of a correction unit 80 included in an image display device of the second embodiment. The image display device of this embodiment is substantially the same as that of the above first embodiment. Thus, in the following description, for parts that are the same as in the first embodiment, the same reference characters will be used and descriptions will be omitted or simplified.

In this embodiment, the display unit 5 displays N (N is an integer of two or larger) different images in N (1st to Nth) respective display directions. Further, defect information stored in the defect information storage unit 2 includes information indicating a defective sub-pixel and information indicating one or more defect display directions that are display directions in which the defective sub-pixel is displayed due to a defect of the parallax optical element. The defect display directions are the display directions in which the defective sub-pixel is displayed, other than the original display direction of the defective sub-pixel.

In determining a correction value for the defective sub-pixel indicated by the defect information, if one of the one or more defect display directions indicated by the defect information is a priority display direction (referred to below as the "priority direction") predetermined among the 1st to Nth display directions, the correction unit 80 determines a correction value for the priority direction. Specifically, the correction unit 80 determines, on the basis of the grayscale values of multiple sub-pixels whose original display direction is the priority direction, as a correction value, a grayscale value corresponding to the defective sub-pixel for the image displayed in the priority direction. Then, the correction unit 80 outputs a corrected image signal including, as a grayscale value of the defective sub-pixel, the correction value determined for the priority direction.

If the original display direction of the defective sub-pixel indicated by the defect information is the priority direction, the correction unit 80 outputs a corrected image signal including the grayscale value of the defective sub-pixel without correcting the grayscale value of the defective sub-pixel included in the image signal I.

If none of the defect display directions of the defective sub-pixel is the priority direction and the original display direction of the defective sub-pixel is also not the priority direction, the correction unit 80 determines a correction value for each defect display direction and outputs a corrected image signal including, as a grayscale value of the defective sub-pixel, the smallest of the grayscale value of the defective sub-pixel included in the image signal I and the correction value for each defect display direction, as described in the first embodiment, for example.

As illustrated in FIG. 8, the correction unit 80 receives priority direction information, in addition to the image signal I and defect information. The priority direction information is information indicating the priority direction, i.e., the display direction in which a defect of the parallax optical element should be preferentially made less visible. In a case where a direction to be given priority is clear in advance or other cases, the priority direction information may indicate a fixed priority direction. For example, in a case where the image display device is one that displays different images to a driver's seat and a passenger's seat, from the viewpoint of improving visibility of the screen in driving to improve safety, the display direction to the driver's seat is determined as the priority direction. However, the priority direction information may be variable, and for example, may be stored in a register and capable of being freely changed by a user.

In FIG. 8, the correction unit 80 includes a display position information obtaining unit 51, a priority direction/defective sub-pixel determination unit (or priority direction/defective sub-pixel determiner) 81, and a priority direction correction value calculation unit (or priority direction correction value calculator) 82.

The display position information obtaining unit 51 sequentially receives the grayscale value of each sub-pixel of the image signal I, obtains display position information indicating a display position of each sub-pixel, and sequentially outputs the grayscale value of each sub-pixel and the display position information of each sub-pixel, as in the first embodiment.

The priority direction/defective sub-pixel determination unit 81 receives the grayscale value of a sub-pixel and its display position information output by the display position information obtaining unit 51, the defect information from the defect information storage unit 2, and the priority direction information. The priority direction/defective sub-pixel determination unit 81 first determines whether the grayscale value of the sub-pixel output by the display position information obtaining unit 51 is to be displayed at the position indicated by the defect information. Then, if it is determined that the grayscale value of the sub-pixel is not to be displayed at the position indicated by the defect information, the priority direction/defective sub-pixel determination unit 81 simply outputs the grayscale value of the sub-pixel as the corrected grayscale value (i.e., the grayscale value of the sub-pixel in the corrected image signal). On the other hand, if it is determined that the grayscale value of the sub-pixel is to be displayed at the position indicated by the defect information, the priority direction/defective sub-pixel determination unit 81 determines whether the original display direction of the sub-pixel is the priority direction. If the original display direction of the sub-pixel is the priority direction, since there is no effect of the defect of the parallax optical element when the sub-pixel is viewed from the priority direction, the priority direction/defective sub-pixel determination unit 81 simply outputs the grayscale value of the sub-pixel as the corrected grayscale value (i.e., the grayscale value of the sub-pixel in the corrected image signal). If the original display direction of the sub-pixel is not the priority direction, the priority direction/defective sub-pixel determination unit 81 determines the sub-pixel as a sub-pixel to be corrected, and outputs, to the priority direction correction value calculation unit 82, the grayscale value of the sub-pixel to be corrected and the grayscale values of one or more sub-pixels displayed on the periphery thereof. The priority direction/defective sub-pixel determination unit 81 may include a memory to output the grayscale value of the sub-pixel to be corrected and the grayscale values of the one or more sub-pixels peripheral thereto.

The priority direction correction value calculation unit 82 receives the above grayscale value of the sub-pixel to be corrected from the priority direction/defective sub-pixel determination unit 81, the above grayscale values of the one or more sub-pixels peripheral to the sub-pixel to be corrected, the priority direction information, and the defect information. The priority direction correction value calculation unit 82 determines, on the basis of the priority direction information and defect information, whether one of the one or more defect display directions of the sub-pixel to be corrected is the priority direction. If one of the defect display directions is the priority direction, the priority direction correction value calculation unit 82 calculates a correction value from the grayscale values of one or more sub-pixels that are located on the periphery of the sub-pixel to be corrected, are displayed in the priority direction, and have the same color as the sub-pixel, and outputs the obtained correction value as the corrected grayscale value (i.e., the grayscale value of the sub-pixel to be corrected in the corrected image signal). The correction value can be determined in the same way as in the first embodiment; for example, it is possible to determine, as the correction value, an average value of the grayscale values of the four sub-pixels located on the upper, lower, left, and right sides of the sub-pixel to be corrected. If none of the defect display directions is the priority direction, the priority direction correction value calculation unit 82 calculates a correction value for each defect display direction, from the grayscale values of one or more sub-pixels that are located on the periphery of the sub-pixel to be corrected, are displayed in the defect display direction, and have the same color as the sub-pixel, and outputs, as the corrected grayscale value, the smallest of the grayscale value of the sub-pixel to be corrected and the correction value for each defect display direction. In the above process, the original display direction of each sub-pixel can be uniquely determined from the display position of the sub-pixel. For example, in the sub-pixel arrangement in FIG. 3, from the fact that a red sub-pixel in an odd-numbered pixel on an odd line is a sub-pixel of the left image, it can be seen that the original display direction of the sub-pixel is the left direction.

Figure 9:
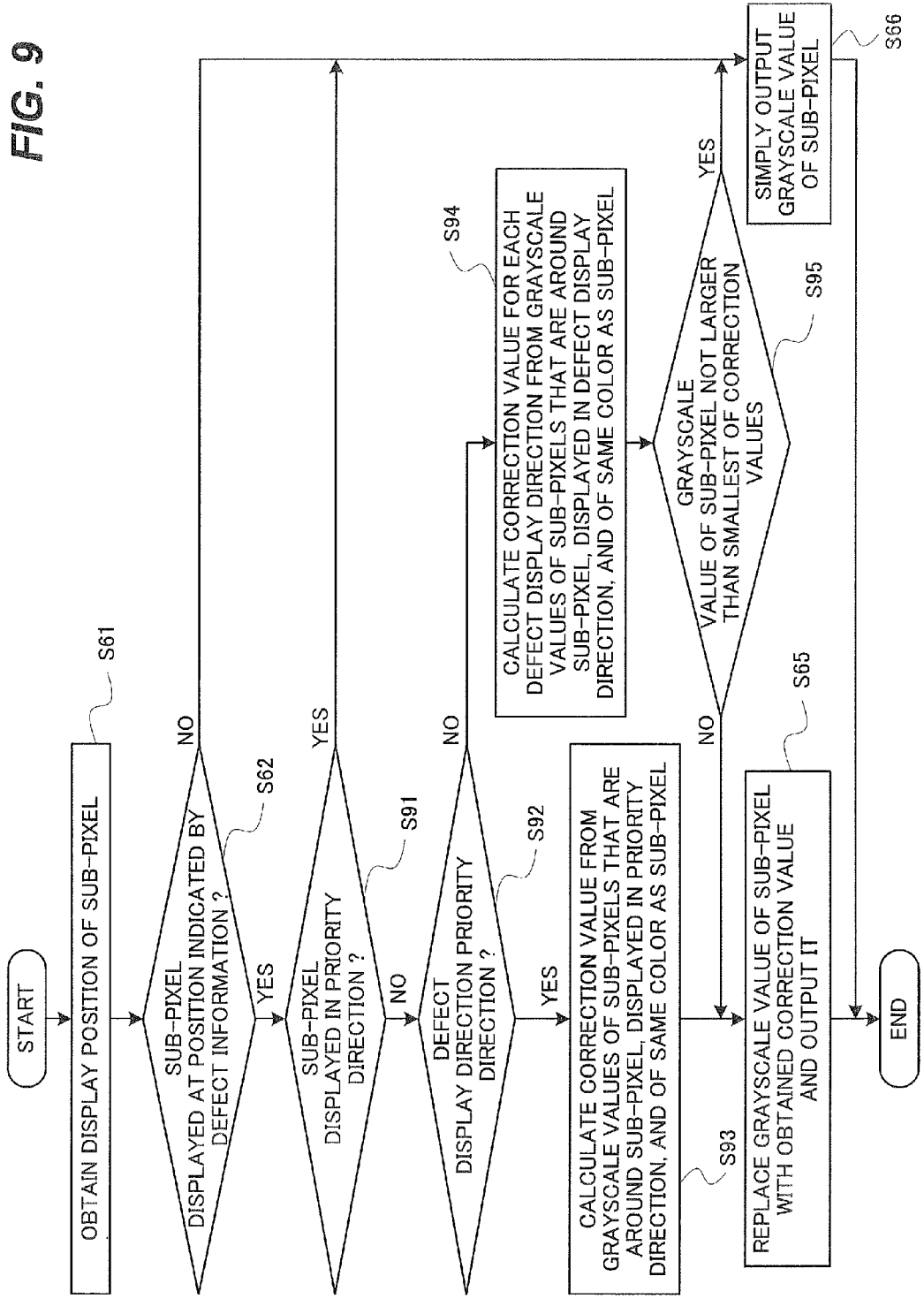
FIG. 9 is a flowchart illustrating the operation of the correction unit in the second embodiment.

FIG. 9 is a flowchart illustrating the process of the correction unit 80. The operation of the correction unit 80 will be described below with reference to FIG. 9. The process of FIG. 9 is performed on the grayscale value of each sub-pixel of the image signal I.

When the correction unit 80 obtains the grayscale value of a sub-pixel, it obtains display position information of the sub-pixel (S61).

Next, the correction unit 80 determines, on the basis of the display position information obtained in step S61 and the defect information, whether the sub-pixel is a sub-pixel displayed at the position indicated by the defect information (S62).

If it is determined that the sub-pixel is not the sub-pixel displayed at the position indicated by the defect information (NO in S62), the correction unit 80 simply outputs the grayscale value of the sub-pixel without correcting it (S66), and ends the process.

On the other hand, if it is determined that the sub-pixel is the sub-pixel displayed at the position indicated by the defect information (YES in S62), the correction unit 80 determines whether the original display direction of the sub-pixel is the predetermined priority direction (S91).

Then, if it is determined that it is the priority direction (YES in S91), the correction unit 80 simply outputs the grayscale value of the sub-pixel without correcting it (S66), and ends the process.

On the other hand, if it is determined that it is not the priority direction (NO in S91), the correction unit 80 determines whether one of the one or more defect display directions indicated by the defect information is the predetermined priority direction (S92).

Then, if it is determined that it is the priority direction (YES in S92), the correction unit 80 calculates a correction value from the grayscale values of one or more sub-pixels that are located on the periphery of the sub-pixel, are displayed in the priority direction, and have the same color as the sub-pixel (S93), and proceeds to step S65.

In step S65, the correction unit 80 replaces the grayscale value of the sub-pixel to be corrected with the correction value calculated in step S93 and outputs it.

On the other hand, if it is determined that it is not the priority direction (NO in S92), the correction unit 80 calculates a correction value for each defect display direction indicated by the defect information, from the grayscale values of one or more sub-pixels that are located on the periphery of the sub-pixel, are displayed in the defect display direction, and have the same color as the sub-pixel (S94), and proceeds to step S95.

In step S95, the correction unit 80 determines whether the grayscale value of the sub-pixel is equal to or smaller than the smallest of the correction values calculated in step S94.

If it is determined that the grayscale value of the sub-pixel is equal to or smaller than the smallest of the correction values (YES in S95), the correction unit 80 simply outputs the grayscale value of the sub-pixel without correcting it (S66), and ends the process.

On the other hand, if it is determined that the grayscale value of the sub-pixel is larger than the smallest of the correction values (NO in S95), the correction unit 80 replaces the grayscale value of the sub-pixel with the smallest of the correction values calculated in step S94 and outputs it (S65).

The following advantages (4) and (5) can be obtained from this second embodiment described above.

(4) If one of the one or more defect display directions of the defective sub-pixel is a predetermined priority display direction, the correction unit in this second embodiment determines a correction value for the priority display direction, and outputs the obtained correction value as a corrected grayscale value of the defective sub-pixel. This can make the effect of the defect of the parallax optical element less visible and prevent deterioration of the visibility or display quality, in the priority display direction.

(5) If the original display direction of the defective sub-pixel is a predetermined priority display direction, the correction unit does not perform correction on the grayscale value of the defective sub-pixel. Thus, it is possible, when the original display direction of the defective sub-pixel is the priority display direction, to prevent the defective sub-pixel from becoming a dark spot due to correction and prevent deterioration of the visibility or display quality, in the priority display direction.

In this embodiment, in a case where the number of display directions of the display unit 5 is two (i.e., N=2), since the other one of the display directions other than the original display direction of the defective sub-pixel is always the defect display direction, the defect information storage unit 2 need not store the information indicating the defect display directions. Also, in a case where the correction unit 80 can determine the defect display directions in another way, the defect information storage unit 2 need not store the information indicating the defect display directions.

Further, the correction unit 80 may be modified as in the following items (a) to (c).

(a) If one of the one or more defect display directions of the defective sub-pixel is the priority direction, the correction unit 80 determines a correction value for the priority direction and outputs the determined correction value as a corrected grayscale value of the defective sub-pixel, as described above. Otherwise, i.e., if a display direction other than the defect display direction is the priority direction, even if the original display direction of the defective sub-pixel is the priority direction, the correction unit 80 determines a correction value for each defect display direction and outputs, as a corrected grayscale value of the defective sub-pixel, the smallest of the grayscale value of the defective sub-pixel and the correction value for each defect display direction, as in the first embodiment.

(b) If the original display direction of the defective sub-pixel is the priority direction, the correction unit 80 outputs the grayscale value of the defective sub-pixel without correcting it, as described above. Otherwise, i.e., if a display direction other than the original display direction of the defective sub-pixel is the priority direction, even if one of the one or more defect display directions is the priority direction, the correction unit 80 determines a correction value for each defect display direction and outputs, as a corrected grayscale value of the defective sub-pixel, the smallest of the grayscale value of the defective sub-pixel and the correction value for each defect display direction, as in the first embodiment.

(c) Instead of determining a correction value for the priority direction if one of the one or more defect display directions of the defective sub-pixel is the priority direction, the correction unit 80 determines a correction value for the priority direction if one of the one or more other display directions of the N display directions different from the original display direction of the defective sub-pixel is the priority direction, and outputs the determined correction value as a corrected grayscale value of the defective sub-pixel. In this configuration, the correction unit 80 need not determine the defect display directions, and the defect information storage unit 2 need not store the information indicating the defect display directions. Also, in this configuration, if the original display direction of the defective sub-pixel is the priority direction, the correction unit 80 may output the grayscale value of the defective sub-pixel without correcting it.

Third Embodiment

Figure 10:
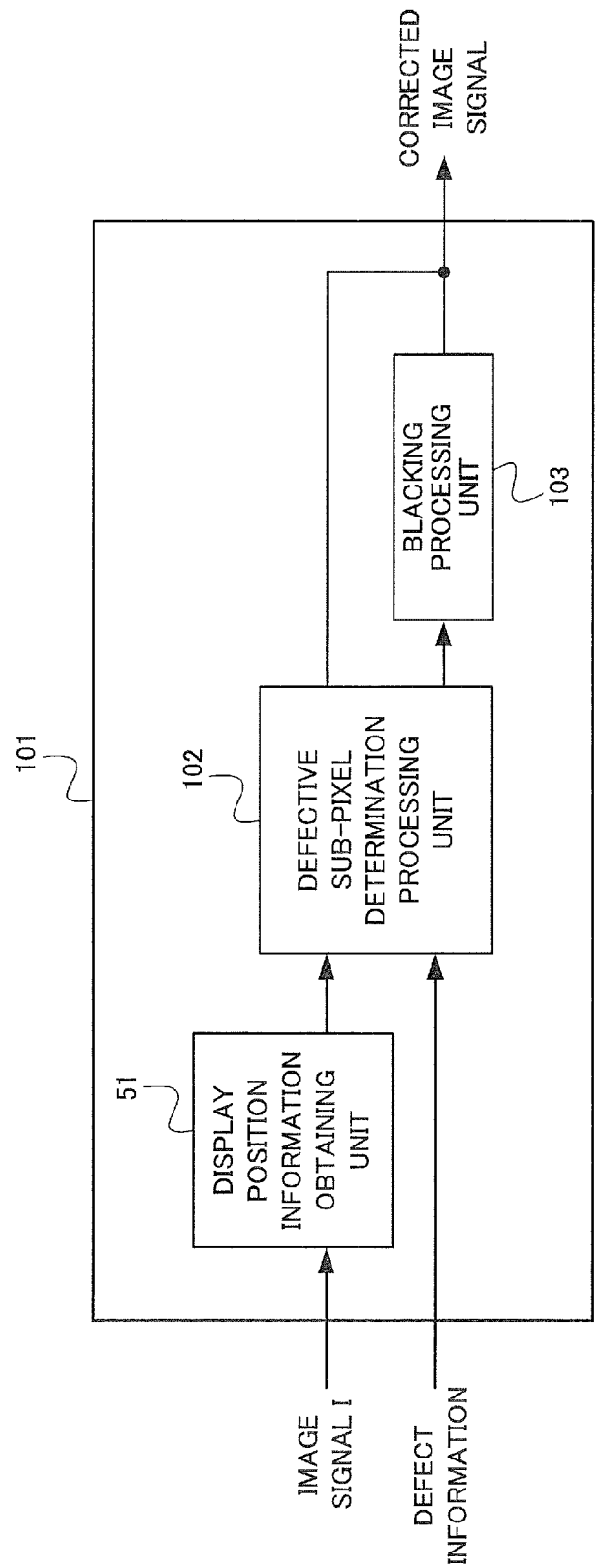
FIG. 10 is a block diagram illustrating a configuration of a correction unit in a third embodiment.

FIG. 10 is a block diagram illustrating a configuration of a correction unit 101 included in an image display device of the third embodiment. The image display device of this embodiment is substantially the same as that of the first embodiment. Thus, in the following description, for parts that are the same as in the first embodiment, the same reference characters will be used and descriptions will be omitted or simplified.

In FIG. 10, the correction unit 101 includes a display position information obtaining unit 51, a defective sub-pixel determination processing unit (or defective sub-pixel determination processor) 102, and blacking processing unit (or blacking processor) 103.

The display position information obtaining unit 51 sequentially receives the grayscale value of each sub-pixel of the image signal I, obtains display position information indicating the display position of each sub-pixel, and sequentially outputs the grayscale value of each sub-pixel and the display position information of each sub-pixel, as in the first embodiment.

The defective sub-pixel determination processing unit 102 receives the grayscale value of a sub-pixel and its display position information output by the display position information obtaining unit 51, and the defect information from the defect information storage unit 2. The defective sub-pixel determination processing unit 102 determines, from the display position information and defect information, whether the grayscale value of the sub-pixel to be processed is to be displayed at the position indicated by the defect information. Then, if it is determined that it is not the grayscale value of the sub-pixel displayed at the position indicated by the defect information, the defective sub-pixel determination processing unit 102 simply outputs the grayscale value of the sub-pixel as a corrected grayscale value (i.e., grayscale value of the sub-pixel in a corrected image signal). On the other hand, if it is determined that it is the grayscale value of the sub-pixel displayed at the position indicated by the defect information, the defective sub-pixel determination processing unit 102 determines the sub-pixel as a sub-pixel to be corrected, and instructs the blacking processing unit 103 to perform a blacking process.

In response to the above instruction from the defective sub-pixel determination processing unit 102, the blacking processing unit 103 replaces the grayscale value of the sub-pixel to be corrected with a grayscale value (e.g., zero) corresponding to black and outputs it as a corrected grayscale value (i.e., grayscale value of the sub-pixel to be corrected in a corrected image signal).

Figure 11:
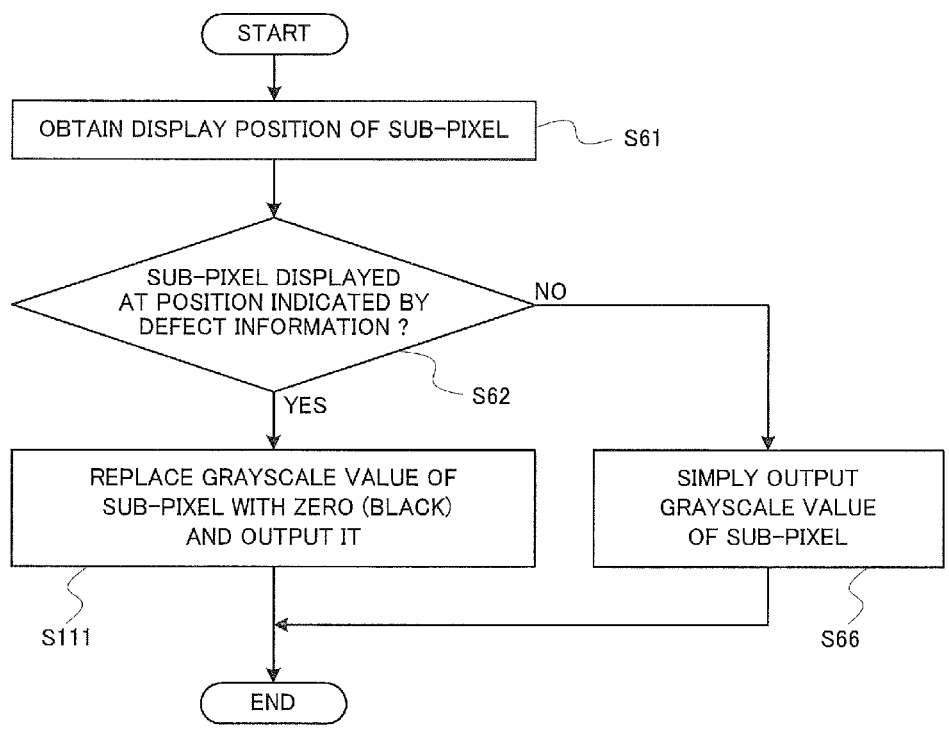
FIG. 11 is a flowchart illustrating the operation of the correction unit in the third embodiment.

FIG. 11 is a flowchart illustrating the process of the correction unit 101. The operation of the correction unit 101 will be described below with reference to FIG. 11. The process of FIG. 11 is performed on the grayscale value of each sub-pixel of the image signal I.

When the correction unit 101 obtains the grayscale value of a sub-pixel, it obtains display position information of the sub-pixel (S61).

Next, the correction unit 101 determines, on the basis of the display position information obtained in step S61 and the defect information, whether the sub-pixel is the sub-pixel displayed at the position of the defect of the parallax optical element (S62).

If it is determined that the sub-pixel is not the sub-pixel displayed at the position of the defect of the parallax optical element (NO in S62), the correction unit 101 simply outputs the grayscale value of the sub-pixel without correcting it (S66), and ends the process.

On the other hand, if it is determined that the sub-pixel is the sub-pixel displayed at the position indicated by the defect information (YES in S62), the correction unit 101 corrects the grayscale value of the sub-pixel to a grayscale value (here, zero) representing black and outputs it (S111).

The following advantages (6) and (7) can be obtained from this third embodiment described above.

(6) The correction unit in this third embodiment replaces the grayscale value of the defective sub-pixel with a grayscale value corresponding to black and outputs it. This makes it possible to prevent the occurrence of a bright spot in both the original display direction of the defective sub-pixel and the one or more display directions other than the original display direction of the defective sub-pixel.

(7) The correction unit in this third embodiment replaces the grayscale value of the defective sub-pixel with a grayscale value corresponding to black and outputs it. This can eliminate the effect of the defect of the parallax optical element in the one or more display directions other than the original display direction of the sub-pixel. For example, in a display direction affected by a barrier defect, making the sub-pixel black brings a state equivalent to a state where the parallax barrier functions normally, and the effect of the barrier defect can be eliminated.

The above first to third embodiments emphasize preventing the occurrence of a bright spot. This is because a bright spot is so conspicuous that it tends to cause deterioration of the visibility. This is also because, typically, the allowed number of bright spots in one display is small as compared to dark spots.

In the first to third embodiments described above, the functions of the image processing device may be implemented purely by electronic circuits and other hardware resources, or by cooperation of hardware resources and software. If it is implemented by cooperation of hardware resources and software, the functions of the image processing device are implemented by, for example, execution of an image processing program by a computer. More specifically, an image processing program stored in a storage medium such as a read only memory (ROM) is read into a main memory and executed by a central processing unit (CPU), thereby implementing the functions of the image processing device. The image processing program may be provided by storing it in a computer-readable storage medium such as an optical disc, or may be provided through a communication line such as the Internet.

The present invention is not limited to the embodiments described above; it can be practiced in various aspects without departing from the scope of the present invention.

DESCRIPTION OF REFERENCE CHARACTERS

1 image input unit, 2 defect information storage unit, 3, 80, 101 correction unit, 4 timing signal generation unit, 5 display unit, 21 backlight, 22 liquid crystal panel, 23 parallax barrier, 51 display position information obtaining unit, 52 defective sub-pixel determination unit, 53 correction value calculation unit, 54 grayscale comparison unit, 81 priority direction/defective sub-pixel determination unit, 82 priority direction correction value calculation unit, 100 image display device, 102 defective sub-pixel determination processing unit, 103 blacking processing unit.

What is claimed is:

1. An image processing device comprising:
   an image input terminal that receives an image signal for a display for displaying a plurality of different images in a plurality of different respective display directions, the display including a plurality of pixels and a parallax optical element, the plurality of pixels each including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display, the image signal including a grayscale value corresponding to each of the sub-pixels of the display;
   a defect information memory that stores defect information indicating a defective sub-pixel, the defective sub-pixel being one of the sub-pixels that is displayed in one or more display directions (hereinafter referred to as the defect display directions) of the plurality of display directions in addition to the predetermined display direction of the sub-pixel due to a defect of the parallax optical element; and
   a corrector that determines, as a correction value, on a basis of the grayscale value of at least one sub-pixel whose predetermined display direction is another display direction different from the predetermined display direction of the defective sub-pixel indicated by the defect information in the image signal, a grayscale value corresponding to the defective sub-pixel for the image displayed in said another display direction, and outputs a corrected image signal including, as a grayscale value of the defective sub-pixel, the smaller of the grayscale value of the defective sub-pixel included in the image signal and the correction value.

2. The image processing device of claim 1, wherein the plurality of display directions comprise three or more display directions, and wherein the corrector determines, for each of the defect display directions, as a correction value, on a basis of the grayscale value of at least one sub-pixel whose predetermined display direction is the defect display direction, a grayscale value corresponding to the defective sub-pixel for the image displayed in the defect display direction, and outputs a corrected image signal including, as a grayscale value of the defective sub-pixel, the smallest of the grayscale value of the defective sub-pixel included in the image signal and the correction value determined for each of the defect display directions.

3. The image processing device of claim 1, wherein the plurality of display directions comprise three or more display directions, and wherein the corrector determines, for each of the two or more other display directions of the plurality of display directions different from the predetermined display direction of the defective sub-pixel, as a correction value, on a basis of the grayscale value of at least one sub-pixel whose predetermined display direction is the other display direction, a grayscale value corresponding to the defective sub-pixel for the image displayed in the other display direction, and outputs a corrected image signal including, as a grayscale value of the defective sub-pixel, the smallest of the grayscale value of the defective sub-pixel included in the image signal and the correction value determined for each of the other display directions.

4. The image processing device of claim 1, wherein if one of the defect display directions is a priority display direction predetermined among the plurality of different display directions, the corrector determines the correction value for the priority display direction, and outputs a corrected image signal including, as a grayscale value of the defective sub-pixel, the correction value determined for the priority display direction instead of the smaller value.

5. The image processing device of claim 1, wherein if one of the one or more other display directions of the plurality of display directions different from the predetermined display direction of the defective sub-pixel is a priority display direction predetermined among the plurality of different display directions, the corrector determines the correction value for the priority display direction, and outputs a corrected image signal including, as a grayscale value of the defective sub-pixel, the correction value determined for the priority display direction instead of the smaller value.

6. The image processing device of claim 1, wherein if the predetermined display direction of the defective sub-pixel is a priority display direction predetermined among the plurality of different display directions, the corrector outputs a corrected image signal including the grayscale value of the defective sub-pixel included in the image signal instead of the smaller value.

7. The image processing device of claim 1, wherein the corrector determines the correction value on a basis of the grayscale value of at least one sub-pixel whose predetermined display direction is said another display direction and that is located on a periphery of the defective sub-pixel and has the same color as the defective sub-pixel.

8. The image processing device of claim 1, wherein the corrector outputs a corrected image signal including, as a grayscale value of the defective sub-pixel, a grayscale value corresponding to black, instead of determining the correction value and outputting the corrected image signal including the smaller value as the grayscale value of the defective sub-pixel.

9. An image display device comprising:
the image processing device of claim 1; and
the display that displays the plurality of different images in the plurality of different respective display directions on a basis of the corrected image signal output by the corrector.

10. An image processing method comprising:
receiving an image signal for a display for displaying a plurality of different images in a plurality of different respective display directions, the display including a plurality of pixels and a parallax optical element, the plurality of pixels each including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display, the image signal including a grayscale value corresponding to each of the sub-pixels of the display;
storing defect information indicating a defective sub-pixel, the defective sub-pixel being one of the sub-pixels that is displayed in one or more display directions of the plurality of display directions in addition to the predetermined display direction of the sub-pixel due to a defect of the parallax optical element; and
determining, as a correction value, on a basis of the grayscale value of at least one sub-pixel whose predetermined display direction is another display direction different from the predetermined display direction of the defective sub-pixel indicated by the defect information in the image signal, a grayscale value corresponding to the defective sub-pixel for the image displayed in said another display direction, and outputting a corrected image signal including, as a grayscale value of the defective sub-pixel, the smaller of the grayscale value of the defective sub-pixel included in the image signal and the correction value.

11. A non-transitory computer-readable storage medium storing an image processing program causing a computer to execute:
receiving an image signal for a display for displaying a plurality of different images in a plurality of different respective display directions, the display including a plurality of pixels and a parallax optical element, the plurality of pixels each including two or more sub-pixels corresponding to two or more respective colors, the parallax optical element directing light from each of the sub-pixels in a display direction predetermined for each sub-pixel among the plurality of display directions, the sub-pixels displayed in the respective display directions being mixed together in the display, the image signal including a grayscale value corresponding to each of the sub-pixels of the display;
storing defect information indicating a defective sub-pixel, the defective sub-pixel being one of the sub-pixels that is displayed in one or more display directions of the plurality of display directions in addition to the predetermined display direction of the sub-pixel due to a defect of the parallax optical element; and determining, as a correction value, on a basis of the grayscale value of at least one sub-pixel whose predetermined display direction is another display direction different from the predetermined display direction of the defective sub-pixel indicated by the defect information in the image signal, a grayscale value corresponding to the defective sub-pixel for the image displayed in said another display direction, and outputting a corrected image signal including, as a grayscale value of the defective sub-pixel, the smaller of the grayscale value of the defective sub-pixel included in the image signal and the correction value.

* * * * *